US008953848B2

(12) United States Patent
Ivanov et al.

(10) Patent No.: US 8,953,848 B2
(45) Date of Patent: *Feb. 10, 2015

(54) METHOD AND APPARATUS FOR AUTHENTICATING BIOMETRIC SCANNERS

(71) Applicant: The University of Maryland, College Park, MD (US)

(72) Inventors: Vladimir Iankov Ivanov, College Park, MD (US); John S. Baras, Potomac, MD (US)

(73) Assignee: University of Maryland, College Park, College Park, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 14/071,607

(22) Filed: Nov. 4, 2013

(65) Prior Publication Data

US 2014/0133714 A1 May 15, 2014

Related U.S. Application Data

(63) Continuation-in-part of application No. 12/838,952, filed on Jul. 19, 2010, now Pat. No. 8,577,091.

(60) Provisional application No. 61/226,512, filed on Jul. 17, 2009.

(51) Int. Cl.
*G06K 9/00* (2006.01)
*G06K 9/62* (2006.01)
*G06K 9/34* (2006.01)

(52) U.S. Cl.
CPC ........ *G06K 9/00087* (2013.01); *G06K 9/00013* (2013.01); *G06K 9/00577* (2013.01); *G06K 2009/00583* (2013.01)
USPC .......................................... 382/115; 382/209

(58) Field of Classification Search
USPC ......... 382/115, 118, 124, 209, 211, 218–220, 382/260, 278; 235/380; 600/506, 559; 340/5.2, 5.52, 5.82
See application file for complete search history.

(56) References Cited

U.S. PATENT DOCUMENTS 5,499,294 A * 3/1996 Friedman ...................... 713/179
5,787,186 A * 7/1998 Schroeder ..................... 382/115
(Continued)

OTHER PUBLICATIONS

Bartlow et al., "Identifying Sensors from Fingerprint Images", 2009 IEEE Computer Society Conference on Computer Vision and Pattern Recognition Workshops, Jun. 20-25, 2009, pp. 78-84.
(Continued)

*Primary Examiner* — Amir Alavi
(74) *Attorney, Agent, or Firm* — Nixon & Vanderhye PC

(57) ABSTRACT

Methods and systems involving image processing extract from an image and estimate unique intrinsic characteristics (scanner pattern) of a biometric scanner, such as area type fingerprint scanner. The scanner pattern is permanent over time, can identify a scanner even among scanners of the same manufacturer and model, and can be used to verify if a scanner acquired an image is the same as the scanner used for biometric enrollment, i.e., to authenticate the scanner and prevent security attacks on it. One method comprises selecting pixels from an enrolled and query image, masking useful pixels from the images, computing a similarity score between the common pixels of the enrolled and query useful pixels, and comparing this score with a threshold to determine whether the query image has been acquired by the same scanner as the enrolled image. The method can further comprise inverting the pixel values and/or filtering the selected pixels.

42 Claims, 10 Drawing Sheets

(56) References Cited

U.S. PATENT DOCUMENTS

| | | | | |
|---|---|---|---|---|
| 5,841,886 | A | * | 11/1998 | Rhoads .......................... 382/115 |
| 5,845,008 | A | * | 12/1998 | Katoh et al. ................... 382/217 |
| 5,862,218 | A | * | 1/1999 | Steinberg ...................... 713/176 |
| 6,868,173 | B1 | * | 3/2005 | Sakai et al. ................... 382/135 |
| 6,898,299 | B1 | * | 5/2005 | Brooks .......................... 382/115 |
| 6,995,346 | B2 | * | 2/2006 | Johanneson et al. ....... 250/208.1 |
| 7,129,973 | B2 | * | 10/2006 | Raynor ...................... 348/231.3 |
| 7,161,465 | B2 | * | 1/2007 | Wood et al. .................... 340/5.2 |
| 7,181,042 | B2 | * | 2/2007 | Tian .............................. 382/100 |
| 7,317,814 | B2 | * | 1/2008 | Kostrzewski et al. ........ 382/115 |
| 7,360,093 | B2 | | 4/2008 | De Queiroz | |
| 7,616,237 | B2 | | 11/2009 | Fridrich et al. | |
| 7,724,920 | B2 | | 5/2010 | Rhoads | |
| 8,577,091 | B2 | * | 11/2013 | Ivanov et al. .................. 382/115 |
| 2002/0191091 | A1 | | 12/2002 | Raynor | |
| 2004/0113052 | A1 | | 6/2004 | Johanneson et al. | |
| 2006/0036864 | A1 | | 2/2006 | Parulski et al. | |
| 2008/0044096 | A1 | | 2/2008 | Cowburn | |
| 2011/0013814 | A1 | | 1/2011 | Ivanov et al. | |

OTHER PUBLICATIONS

Establishing the Digital Chain of Evidence in Biometric Systems, Ph.D. thesis, 2009, West Virginia University, Morgantown, W. Va.

Bayram et al., "Source Camera Identification Based on CFA Interpolation", Dept. of Electrical Computer Engineering, IEEE International Conference on Image Processing 2005 (ICIP 2005), vol. 3, pp. III-69-72, Sep. 2005.

Bayram, et al., "Improvements on Source Camera-Model I dentification B ased on CFA Interpolation", Proceedings of Working Group 11.9 Int. Conf. Digital Forensics, FL, 2006, 9 pages.

Blythe et al., "Secure Digital Camera", Department of Electrical and Computer Engineering, Digital Forensic Research Workshop, Baltimore, MD, Aug. 2004, 12 pages.

Cappelli et al., "On the Operational Quality of Fingerprint Scanners", IEEE Transactions on Information Forensics and Security, vol. 3, No. 2, pp. 192-202, Jun. 2008.

Çeliktutan eliktutan et al., "Blind Identification of Source Cell-Phone Model", IEEE Transactions on Information Forensics and Security, Sep. 2008, vol. 3, No. 3, pp. 553-566.

Chen et al., Digital Imaging Sensor Identification (Further Study), Proceedings of the SPIE, vol. 6505, Electronic Imaging, Security, Steganography, and Watermarking of Multimedia Contents IX, Jan. 2007, 13 pages.

Chen, et al., "Determining Image Origin and Integrity Using Sensor Noise" IEEE Transactions on Information Forensics and Security, vol. 3, No. 1, pp. 74-90, Mar. 2008.

Chuang, et al., "Tampering I d entification U sing Empirical Frequency Response", Department of Electrical and Computer Engineering, University of Maryland, IEEE International Conference on Acoustics, Speech and Signal Processing, 2009. ICASSP 2009, Apr. 19-24, 2009, pp. 1517-1520.

Dirik, et al., "Source Camera Identification Based on Sensor Dust Characteristics", Polytechnic University, Department of Electrical and Computer Engineering, Proc. Signal Processing Applications Public Security Forensics, Apr. 11-13, 2007, pp. 1-6.

Gamal, et al., "Modeling and Estimation of FPN Components in CMOS Image Sensors", Proceedings of SPIE, vol. 3301, pp. 168-177, 1 998.

Farid et al., "Higher-Order W avelet S tatistics and their Application to Digital F orensics", IEEE Workshop on Statistical Analysis in Computer Vision and Pattern Recognition, Madison, WI, Jun. 2003, pp. 1-8.

Author Unknown, Personal Identity Verification (PIV) Image Quality S pecifications for Single F inger C apture Devices, FBI ens, Jul. 2006, pp. 1-8.

Filler, et al. "Using Sensor Pattern Noise for Camera Model Identification", Proceedings of International Conference on Image Processing 2008, San Diego, CA, Oct. 2008, 4 pages.

Swaminathan, et al., "Digital Image Forensics via Intrinsic Fingerprints", IEEE Transactions on Information Forensics and Security, vol. 3, No. 1, Mar. 2008, pp. 101-117.

Swaminathan, et al, "Component Forensics: Theory, Methodologies, and Applications", IEEE Signal Processing Magazine, Mar. 2009, pp. 38-48.

Bozhao, et al., "Liveness Detection for Fingerprint Scanners B ased on the Statistics of Wavelet Signal Processing", Proceedings of the 2006 Conference on Computer Vision and Pattern Recognition Workshop, (CVPRW'06), Jun. 17-22, 2006, New York, NY, 8 pages.

Tsai, et al. "Camera/Mobile Phone Source Identification for Digital F orensics", Proceedings of IEEE International Conference on Acoustics, Speech, and Signal Processing 2007, pp. II-221-II-224.

Chen, et al., "Source Digital Camcorder Identification Using Sensor Photo Response Non-Uniformity", Proceedings of SPIE Electronic Imaging, Photonics West, Jan. 2007, pp. 1G-1H.

Blaise Gassend, et al., "Identification and Authentication of Integrated Circuits", Concurrency and Computation: Practice and Experience, vol. 16, Issue 11, pp. 1077-1098, Sep. 2004.

Lukas et al., "Digital Bullet Scratches for Images", Proc. ICIP 2005, Sep. 11-14, 2005, Genova, Italy, 4 pages.

Fridrich, "Digital Image Forensics, Introducing Methods that Estimate and Detect Sensor Fingerprint", IEEE Signal Processing Magazine, vol. 26, No. 2, Mar. 2009, pp. 26-37.

Fry, et al., "Fixed-pattern Noise in Photomatrices", IEEE Journal of Solid-State Circuits, vol. 5, No. 5, pp. 250-254, Oct. 1970.

Lukas, et al., "Detecting Digital Image Forgeries Using Sensor Pattern Noise", Proc. of SPIE Electronic Imaging, Photonics West, Jan. 2006, 11 pages.

Lukas et al, "Digital Camera Identification from Sensor Pattern Noise", IEEE Transactions on Information Forensics and Security, vol. 1, Issue 2, pp. 205-214, Jun. 2006.

Lyu et al., "Detecting Hidden Messages Using Higher-Order Statistics and Support Vector Machines", Lecture Notes in Computer Science, Springer, ISSN 0302-9743 (Print), 1611-3349 (Online) vol. 2578/2003, pp. 340-354, Jan. 1, 2003.

Lyu et al., "Steganalysis U sing H igher-Order I mage Statistics", IEEE Transactions on Information Forensics and Security, vol. 1, No. 1, pp. 111-119, Jan. 2006.

Maeda, et al., "An A rtificial F ingerprint D evice (AFD): A Study of I dentification Number A p plications U tilizing Characteristics Variation of Polycrystalline Silicon TFTs" IEEE Transactions on Electron Devices, vol. 50, No. 6, pp. 1451-1458, Jun. 2003.

Kivanc, et al., "Low-Complexity Image Denoising Based on Statistical Modeling of Wavelet C oefficients", IEEE Signal Processing Letters, Dec. 1999, vol. 6, No. 12, pp. 300-303.

Kivanc et al., "Spatially Adaptive Statistical Modeling of Wavelet Image Coefficients and its Application to Denoising", Proc. IEEE Int. Conf. Acoustics, Speech, and Signal Processing, Phoenix, Arizona, vol. 6, pp. 3253-3256, Mar. 1999.

Geradts, et al., "Methods for Identification of Images Acquired with Digital C ameras", Enabling Technologies for Law Enforcement and Security, Feb. 2001, Proc. SPIE vol. 4232, pp. 505-512.

Goljan, et al., "Camera Identification from Cropped and Scaled Images", Proceedings of SPIE, vol. 6819, 68190E (2008), Electronic Imaging, Forensics, Security, Steganography, and Watermarking of Multimedia Contents X, San Jose, CA, Jan. 2008, 13 pages.

Goljan, et al., "Large Scale Test of Sensor Fingerprint Camera Identification", Proc. SPIE, Electronic Imaging, Media Forensics and Security XI, San Jose, CA, Jan. 18-22, 2009, 12 pages.

Goljan, et al., "Managing a Large Database of Camera Fingerprints", Proc. SPIE, Electronic Imaging, Media Forensics and Security XII, San Jose, CA, Jan. 17-21, 2010, pp. 08-01-08-12.

Gou, et al., "Robust Scanner Identification Based on Noise Features", IS&T SPIE Conference on Security, Steganography and Watermarking of Multimedia Contents IX, San Jose, CA, Jan. 2007, 11 pages.

Gou, et al., "Noise Features for Image Tampering Detection and Steganalysis", Proceedings of IEEE International Conference on Image Processing 2007 (ICIP '07), San Antonio, TX, Sep. 2007, 4 pages.

Gou et al., "Intrinsic Sensor Noise Features for Forensic Analysis on Scanners and Scanned Images", IEEE Transactions on Information Forensics and Security, Sep. 2009, vol. 4, No. 3, pp. 476-491.

(56) References Cited

OTHER PUBLICATIONS

Holotyak, et al., "Blind Statistical Steganalysis of Additive Steganography Using Wavelet Higher Order Statistics", Proc. of the 9th IFIP TC-6 TC-11 Conference on Communications and Multimedia Security, Sep. 19-21, 2005, Salzburg, Austria, 12 pages.

Khanna, et al., "A Survey of Forensic Characterization Methods for Physical Devices", Proceedings of the 6th Annual Digital Forensic Research Workshop (DFRWS'06), vol. 3, pp. S17-S28, Sep. 2006.

Khanna, et al., "Forensic Classification of Imaging Sensor Types", SPIE Int. Conf. Security, Steganography, Watermarking Multimedia Contents IX, San Jose, CA, vol. 6505, Jan. 2007, 9 pages.

Khanna, et al., "Scanner Identification Using Sensor Pattern Noise", Proceedings of SPIE Security, Steganography, and Watermarking of Multimedia Contents IX, San Jose, CA, Jan. 2007, 11 pages.

Kharrazi, et al., "Blind Source Camera Identification", International Conference on Image Processing (ICIP) 2004, vol. 1, pp. 709-712, Oct. 2004.

Kurosawa, et al., "CCD Fingerprint Method—Identification of a Video Camera from Videotaped Images", Proceedings of IEEE International Conference on Image Processing, Oct. 1999, vol. 3, pp. 537-540.

Lim, "Two-dimensional Image and Signal Processing", Prentice Hall PTR, 1989, Sections 9.2.1 Wiener filtering, Section 9.2.2 Variations of Wiener filtering, Section 9.2.4 The adaptive Wiener filter and Section 9.2.7 Edge sensitive adaptive image restoration textbook on two-dimensional image and signal processing, 18 pages.

Lukas, et al., "Determining Digital Image Origin Using Sensor Imperfections", Proceedings of SPIE Electronic Imaging, San Jose, CA, pp. 249-260, Jan. 2005.

Sencar et al., "Overview of State-of-the-Art in Digital Image Forensics", Book chapter, 2007, Available online at: http://isis.poly.edu/forensics/pubs/sencar_memon_chapter.pdf, pp. 1-20.

Swaminathan, et al. "Image Tampering Identification Using Blind Deconvolution", IEEE International Conference on Image Processing (ICIP'06), Atlanta, Georgia, pp. 2309-2312, Oct. 2006.

Swaminathan, et al. "Nonintrusive Component Forensics of Visual Sensors Using Output Images", IEEE Transactions on Information Forensics and Security, vol. 2, No. 1, pp. 91-106, Mar. 2007.

U.S. Appl. No. 11/761,241, of Cowburn, filed Jun. 11, 2007.
U.S. Appl. No. 10/328,157, of Johanneson et al., filed Dec. 23, 2002.
U.S. Appl. No. 10/156,721, of Raynor, filed May 28, 2002.
U.S. Appl. No. 11/253,854, of Parulski, et al., filed Oct. 18, 2005.

\* cited by examiner

| SCENARIO | APPLIED OBJECT FOR SCANNER ENROLMENT | APPLIED OBJECT FOR SCANNER VERIFICATION | PROVIDED SECURITY |
|---|---|---|---|
| A | PREDETERMINED | PREDETERMINED | WEAK |
| B | PREDETERMINED | FINGERTIP | MEDIUM |
| C | FINGERTIP | FINGERTIP | STRONG |

METHOD AND APPARATUS FOR AUTHENTICATING BIOMETRIC SCANNERS

CROSS-REFERENCES TO RELATED APPLICATIONS

This application is a continuation-in-part of U.S. application Ser. No. 12/838,952, filed on Jul. 19, 2010 now U.S. Pat. No. 8,577,091, which claims the benefit of U.S. Provisional Application No. 61/226,512, filed on Jul. 17, 2009. Both applications are incorporated herein by reference in their entirety.

GOVERNMENT SUPPORT

The subject matter disclosed herein was made with government funding and support under DAAD190120011 awarded by the USA Army Research Laboratory (ARL). The government has certain rights in this invention.

FIELD OF TECHNOLOGY

The exemplary implementations described herein relate to security systems and methods, and more particularly, to a method and apparatus for authentication of a biometric scanner.

BACKGROUND

Authentication is the verification of a claim about the identity of a person or a system. The information about human physiological and behavioral traits, collectively called biometric information or simply biometrics, can be used to identify a particular individual with a high degree of certainty and therefore can authenticate this individual by measuring, analyzing, and using these traits. Well-known types of biometrics include photographs, fingerprints, palm prints, iris scans, and blood vessel scans. A great variety of specific devices are used to extract and collect biometric information which are referred to hereinafter as biometric scanners. Despite all advantages of using biometrics over using other methods for authentication of people, the biometric information of an individual can have significant weaknesses. The biometric information has a low level of security in that it can be counterfeited. The biometric in formation once compromised is not easily changeable or replaceable. Another problem is that biometric information is inexact and time varying, "noisy" (e.g., it is not like a password or a PIN code) as it cannot be reproduced exactly from one measurement to another, and thus it can be matched only approximately when used in conjunction with biometric scanners. All these weaknesses and problems imperil the confidence in the reliable use of biometrics in everyday life.

One of the most widely used biometrics is the fingerprint—it has been used for identifying individuals for over a century. The surface of the skin of a human fingertip consists of a series of ridges and valleys that form a unique fingerprint pattern. The fingerprint patterns are highly distinct, they develop early in life, and their details are relatively permanent over time. In the last several decades, extensive research in algorithms for identification based on fingerprint patterns has led to the development of automated biometric systems using fingerprints with various applications including law enforcement, border control, enterprise access and access to computers and other portable devices. Although fingerprint patterns change little over time, changes in the environment (e.g., humidity and temperature changes), cuts and bruises, and changes due to aging pose challenges to using fingerprint patterns in conjunction with scanning devices for identifying individuals. Similar problems exist when using other biometric information in conjunction with scanners for identifying individuals.

Using biometric information for identifying individuals involves the steps of biometric enrolment and biometric verification. For example, in the case of fingerprint patterns, a typical biometric enrolment requires acquiring a fingerprint image with a fingerprint scanner, extracting from the fingerprint image information that is sufficient to identify the user, and storing the extracted information as template biometric information for future comparison with subsequently provided fingerprint images. Several, typically three, images are acquired from the same fingertip for biometric enrolment. A typical biometric verification involves acquiring another subsequent image of the fingertip and extracting from that image information query biometric information which is then compared with the template biometric information. If the compared information is sufficiently similar, the result is deemed to be a biometric match. In this case, the user's identity is verified positively and the user is successfully authenticated. If the compared information is not sufficiently similar, the result is deemed a biometric on-match, the user's identity is not verified, and the biometric authentication fails.

One proposed way of improving or enhancing the security of the systems that use biometric information is by using digital watermarking—embedding information into digital signals that can be used, for example, to identify the signal owner and to detect tampering with the signal. The digital water mark can be embedded in the signal domain, in a transform domain, or added as a separate signal. If the embedded information is unique for every particular originator (e.g., in the case of an image, the camera or the scanner used to acquire the image), the digital watermarking can be used to establish authenticity of the digital signal by methods well known in the prior art. However, robust digital watermarking, i.e., one that cannot be easily detected, removed, or copied, requires computational power that is typically not available in biometric scanners and, generally, comes at high additional cost. In order to ensure the uniqueness of the originator (e.g., the camera or scanner), the originator also needs an intrinsic, inherent source of randomness.

To solve the problem of associating a unique number with a particular system or device, it has been proposed to store the number in a flash memory or in a mask Read Only Memory (ROM). The major disadvantages of this proposal are the relative high added cost, the man-made randomness of the number, which number is usually generated during device manufacturing, and the ability to record and track this number by third parties. There have also been proposals to introduce randomness by exploiting the variability and randomness created by mismatch and other physical phenomena in electronic devices or by using physically unclonable functions (PUF) that contain physical components with sources of randomness. Such randomness can be explicitly introduced (by the system designer) or intrinsically present (e.g., signal propagation delays within batches of integrated circuits). However, all of these proposed methods and systems come at additional design, manufacturing, and/or material cost.

The prior art teaches methods for identification of digital cameras based on the sensor pattern noise: fixed pattern noise and photo-response non-uniformity. However, these methods are not suited to be used for biometric authentication using fingerprints because the methods require many (in the order of tens to one hundred) images, taken under special conditions and with specific texture. The prior art methods also use computationally intensive signal processing with many underlying assumptions about the statistical properties of the sensor pattern noise. Attempts to apply these methods for authentication of optical fingerprint scanners have been made in laboratory studies without any real success and they are insufficiently precise when applied to capacitive fingerprint scanners, because the methods implicitly assume acquisition models that are specific for the digital cameras but are very different from the acquisition process of capacitive fingerprint scanners. Attempts to apply these methods to fingerprint scanners have been made, which only demonstrated the unsuitability of these methods for authentication (and identification) of capacitive fingerprint scanners, and in particular their unsuitability for systems with limited computational power. The prior art also teaches about distinguishing among different types and models of digital cameras based on their processing artifacts (e.g., their color filter array interpolation algorithms), which is suited for camera classification (i.e., determining the brand or model of a particular camera), but not for camera identification (i.e., which particular camera has acquired a particular image).

Aside from the high cost associated with the above described security proposals, another disadvantage is that they cannot be used in biometric scanners that have already been manufactured and placed in service.

SUMMARY

In order to overcome security problems associated with biometric scanners and systems in the prior art, exemplary illustrative non-limiting implementations of methods and apparatuses are herein described which enhance or improve the security of existing or newly manufactured biometric scanners and systems by authenticating the biometric scanner itself in addition to authenticating the submitted biometric information.

A biometric scanner converts the biometric information into signals that are used by a system, e.g., a computer, a smart phone, or a door lock, to automatically verify the identity of a person. A fingerprint scanner, a type of biometric scanner, converts the surface or subsurface of the skin of a fingertip into one or several images. In practice, this conversion process can never be made perfect. The imperfections induced by the conversion process can be classified into two general categories: imperfections that are largely time invariant, hereinafter referred to as the scanner pattern, and imperfections that change over time, hereinafter referred to as the scanner noise. As will be described herein, the scanner pattern is unique to a particular scanner and, therefore, can be used to verify the identity of the scanner, a process hereinafter referred to as scanner authentication.

By requiring authentication of both the biometric scanner and the biometric information submitted, the submission of counterfeited biometric information—obtained by using a different biometric scanner or copied by other means—can be detected thereby preventing authentication of the submitted counterfeit biometric information. The result is prevention of attacks on the biometric scanner or the system that uses the biometric information, thus increasing the level of security of the biometric authentication.

The illustrative non-limiting implementations disclosed herein are directed to methods and apparatuses that estimate the scanner pattern of a fingerprint scanner without violating the integrity of the scanner by disassembling it, performing measurements inside of it, or applying any other intrusive methods. The scanner pattern is estimated solely from an image or from several images that are acquired by use of the scanner. This estimated scanner pattern is used for scanner authentication.

The scanner authentication comprises scanner enrolment (e.g., extracting and storing scanner pattern or features of a legitimate, authentic scanner) and scanner verification (e.g., extracting scanner pattern or features from a digital image and comparing them with the scanner pattern or features of the authentic fingerprint scanner to verify that the digital image has been acquired with the authentic fingerprint scanner). As will be appreciated by those skilled in the art, biometric scanner authentication will provide an increased level of security in authenticating biometric information. For example, with respect to a fingerprint scanner, attacks on the fingerprint scanner that replace an image containing the fingerprint pattern of the legitimate user and acquired with the authentic fingerprint scanner by another image that still contains the fingerprint pattern of the legitimate user but acquired with an unauthentic fingerprint scanner can be detected. This type of attack has become an important security threat as the widespread use of the biometric technologies makes the biometric information essentially publicly available.

The herein described illustrative non-limiting implementations of biometric scanner authentication can be used in any system that authenticates users based on biometric information, especially in systems that operate in uncontrolled (i.e., without human supervision) environments, in particular in portable devices, such as PDAs, cellular phones, smart phones, multimedia phones, wireless handheld devices, and generally any mobile devices, including laptops, notebooks, netbooks, etc., because these devices can be easily stolen, giving an attacker physical access to them and the opportunity to interfere with the information flow between the biometric scanner and the system. The general but not limited areas of application of the exemplary illustrative non-limiting implementations described herein are in bank applications, mobile commerce, for access to health care anywhere and at any time, for access to medical records, etc.

The subject matter herein described may also be used in hardware tokens. For example, the security of a hardware token equipped with a fingerprint scanner can be improved by adding the above described scanner authentication, and subsequently using the user's fingerprint, thus replacing the authentication based on a secret code with enhanced security biometric authentication, and thereby detecting attacks on the fingerprint scanner.

In one exemplary implementation of the herein described subject matter a computer implemented method determines a scanner pattern of a fingerprint scanner. This method involves acquiring at least one digital image representing biometric information inputted to a sensor of the fingerprint scanner. Pixels are selected from digital images so as to define regions of interest, and the selected pixels from regions of interest are then processed to extract and encode a sequence of numbers containing sufficient information to uniquely represent the fingerprint scanner. The sequence of numbers forms a unique scanner pattern which is stored in a memory for future comparisons with subsequently inputted and processed biometric information.

In another exemplary implementation of the herein described subject matter a computer implemented method for enrolling a biometric scanner involves acquiring at least one digital image representing biometric information inputted to a sensor of the fingerprint scanner. The scanner pattern is then estimated from the digital image by processing selected pixels having unique information that represents the biometric scanner and to thereby form template scanner features. The template scanner features are then stored in a memory for future comparisons with subsequently inputted and processed biometric information.

In yet another exemplary implementation of the herein described subject matter a computer implemented method for verifying the authenticity of a fingerprint scanner involves acquiring at least one digital image representing biometric information inputted to a sensor of the fingerprint scanner. The scanner pattern is then estimated from the digital images by processing selected pixels having unique information that represents the biometric scanner and to thereby form template scanner features. The template scanner features are then stored in a memory for future comparisons with subsequently inputted and processed biometric information. Query scanner features are then extracted from a subsequently acquired digital image by processing pixels of this subsequently acquired digital image. Finally, a comparison is made between the template scanner features and the query scanner features to determine whether the compared scanner features arise from the same scanner.

In another exemplary implementation of the herein described subject matter an apparatus for determining a scanner pattern of a biometric scanner includes a processor having associated memories and input/output ports, and a sensor operatively connected to the processor for transmitting biometric information to the processor for processing into at least one digital image. The processor selects pixels from the at least one digital image to extract and encode a sequence of numbers containing sufficient information to uniquely represent the biometric scanner as a unique scanner pattern. A memory stores the unique scanner pattern for future comparison with subsequently inputted and processed biometric information.

In one exemplary implementation of the described herein subject matter, a method for authenticating biometric scanners from at least one enrolled image and from at least one query image comprises selecting a plurality of pixels of the enrolled image(s) as enrolled selected pixels and a plurality of pixels of the query image(s) as query selected pixels, masking pixels of the enrolled selected pixels as enrolled useful pixels and pixels of the query selected pixels as query useful pixels, computing a similarity score between the common pixels of the enrolled useful pixels and the query useful pixels, and comparing this score with a threshold value to determine whether the query image(s) have been acquired by the same scanner as the enrolled image(s). The method can further comprise inverting the pixel values as well as filtering the enrolled selected pixels and the query selected pixels. A corresponding system implementing this method is also described herein.

In another exemplary implementation, a method extracts the scanner pattern of a biometric scanner from at least one image and comprises selecting a plurality of pixels of the image(s), masking useful pixels of these selected pixels, and computing a sequence of numbers from these useful pixels which number contains information that represents the scanner that acquired the image(s). The sequence of numbers can be stored for future use, e.g., as to identify the scanner. The method can further comprise inverting the pixel values as well as filtering the selected pixels. A corresponding system implementing this method is also described herein.

In yet another exemplary implementation of the herein described subject matter an apparatus for enrolling a biometric scanner includes a processor having one or more associated memories and input/output ports, and a sensor operatively connected to the processor for transmitting biometric information to the processor for processing into at least one digital image. The processor is programmed to estimate a scanner pattern from the at least one digital image by processing selected pixels having unique information that represents the biometric scanner into template scanner features. The template scanner features are stored in a memory for future comparison with subsequently inputted and processed biometric information.

The above described methods can be implemented by an electronic processing circuit configured to perform the enumerated processes or operations. Suitable electronic processing circuits for performing these methods include processors including at least one CPU and associated inputs and outputs, memory devices, and accessible programmed instructions for carrying out the methods, programmable gate arrays programmed to carry out the methods, and ASICs specially designed hardware devices for carrying out the methods.

The herein described subject matter of a computer implemented methods and apparatuses provide superb accuracy in non-intrusively discriminating between an authentic and unauthentic fingerprint scanner, is particularly simple to implement and extremely computationally efficient, and provides reliable and robust performance in a variety of environmental conditions, such as wide-ranging temperature and humidity variations.

BRIEF DESCRIPTION OF THE DRAWINGS

These and further aspects of the exemplary illustrative non-limiting implementations will be better understood in light of the following detailed description of illustrative exemplary non-limiting implementations in conjunction with the drawings, of which.

DETAILED DESCRIPTION

Figure 1:
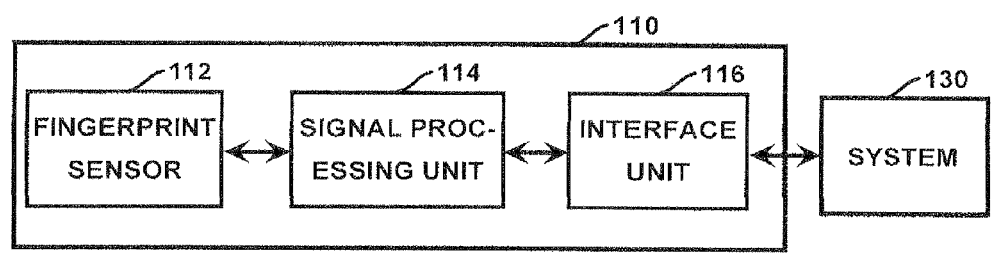
FIG. 1 is a block diagram of a fingerprint scanner.

A typical fingerprint scanner, shown as block 110 in FIG. 1 generally comprises a fingerprint sensor 112, which reads the fingerprint pattern, a signal processing unit 114, which processes the reading of the sensor and converts it into an image, and an interface unit 116, which transfers the image to system 130 that uses it. The system 130 includes, but is not limited to, a desktop or server computer, a door lock for access control, a portable or mobile device such as a laptop, PDA or cellular telephone, hardware token, or any other access control device.

Figure 2:
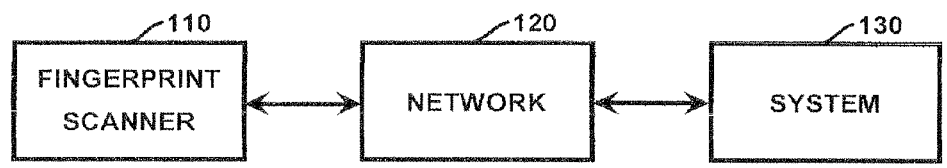
FIG. 2 is a block diagram of a fingerprint scanner connected over a network to a system that uses the image acquired with the fingerprint scanner.
Figure 3:
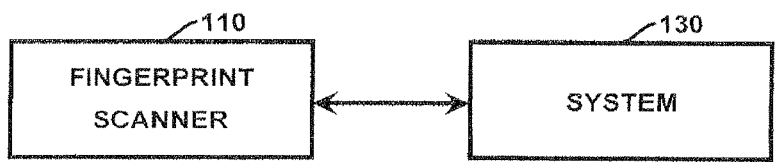
FIG. 3 is a block diagram of a fingerprint scanner connected directly to a system that uses the image acquired with the fingerprint scanner.
Figure 4:
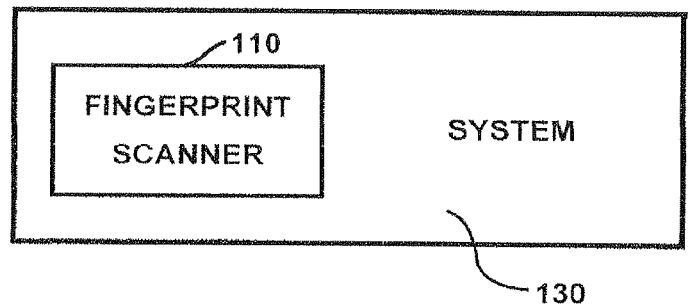
FIG. 4 is a block diagram of a fingerprint scanner that is a part of a system that uses the image acquired with the fingerprint scanner.

As shown in FIG. 2, the fingerprint scanner 110 can be connected to the system 130 via wireless or wired links and a network 120. The network 120 can be for example the Internet, a wireless "WI-FI" network, a cellular telephone network, a local area network, a wide area network, or any other network capable of communicating information between devices. As shown in FIG. 3, the fingerprint scanner 110 can be directly connected to the system 130. As shown in FIG. 4, the fingerprint scanner 110 can be an integral part of the system 130.

Nevertheless, in any of the cases shown in FIGS. 2-4, an attacker who has physical access to the system can interfere with the information flow between the fingerprint scanner and the system in order to influence the operation of the authentication algorithms that are running on the system, for example, by replacing the image that is acquired with the fingerprint scanner by another image that has been acquired with another fingerprint scanner or by an image that has been maliciously altered (e.g., tampered with).

The system 130 in FIG. 2, the system 132 in FIG. 3, and the systems 134 in FIG. 4 may have Trusted Computing (TC) functionality; for example, the systems may be equipped with a Trusted Platform Module (TPM) that can provide complete control over the software that is running and that can be run in these systems. Thus, once the image, acquired with the fingerprint scanner, is transferred to the system software for further processing, the possibilities for an attacker to interfere and maliciously modify the operation of this processing become very limited. However, even in a system with such enhanced security, an attacker who has physical access to the system can still launch an attack by replacing the image acquired with a legitimate, authentic fingerprint scanner, with another digital image. For example, an attacker who has obtained an image of the legitimate user's fingerprint can initiate an authentication session with the attacker's own fingerprint and then, at the interface between the fingerprint scanner and the system, the attacker can replace the image of the attacker's fingerprint with the image of the legitimate user's fingerprint. Most authentication algorithms today will not detect this attack but will report that the user authentication to the system was successful.

Figure 5:
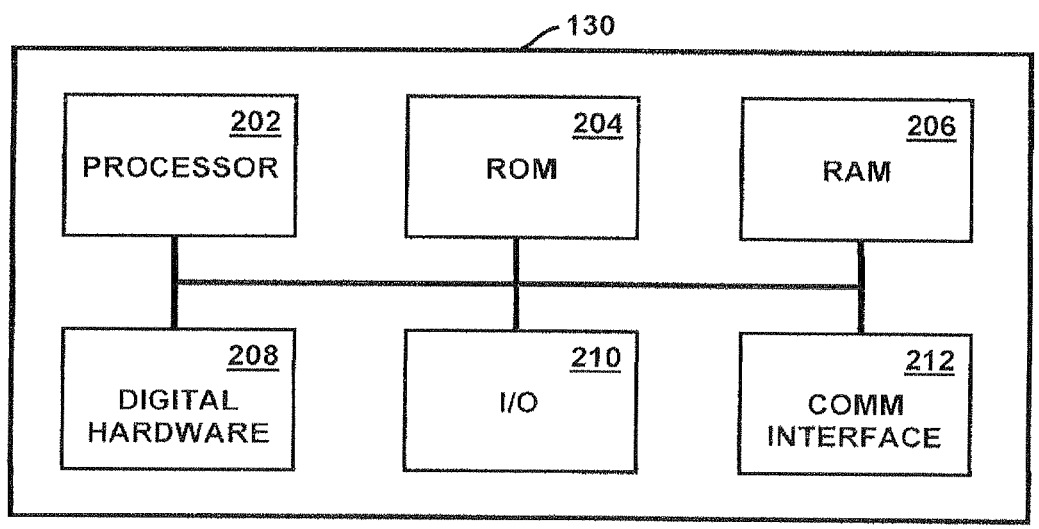
FIG. 5 is an exemplary block diagram of a system that uses biometric information.

FIG. 5 illustrates a typical system 200 that uses biometric information to include one or more processors 202, which comprise but are not limited to general-purpose microprocessors (CISC and RISC), signal processors, microcontrollers, or other types of processors executing instructions. The system 200 may also have a read-only memory (ROM) 204, which includes but is not limited to PROM, EPROM, EEPROM, flash memory, or any other type of memory used to store computer instructions and data. The system 200 may further have random-access memory (RAM) 206, which includes but is not limited to SRAM, DRAM, DDR, or any other memory used to store computer instructions and data. The system 200 may also have digital hardware 208, which includes but is not limited to field-programmable gate arrays (FPGA), complex programmable logic devices (CPLD), programmable logic arrays (PLA), programmable array logic (PAL), application-specific integrated circuits (ASIC), or any other type of hardware that can perform computations and process signals. The system 200 may further have one or several input/output interfaces (I/O) 210, which include but are not limited to a keypad, a keyboard, a touchpad, a mouse, speakers, a microphone, one or several displays, USB interfaces, interfaces to one or more biometric scanners, digital cameras, or any other interfaces to peripheral devices. The system 200 may also have one or several communication interfaces 212 that connect the system to wired networks, including but not limited to Ethernet or fiber-optical links, and wireless networks, including but not limited to CDMA, GSM, WiFi, GPRS, WiMAX, IMT-2000, 3GPP, or LTE. The system 200 may also have storage devices (not shown), including but not limited to hard disk drives, optical drives (e.g., CD and DVD drives), or floppy disk drives. The system 200 may also have TC functionality; for example, it may be equipped with a TPM that can provide complete control over the software that is running and that can be run in it.

The system 130 may be connected to the biometric scanner directly or via a network. The biometric scanner may also be part of the system 130 as in the configuration shown in FIG. 4.

Depending on the sensing technology and the type of the sensor used for image acquisition, fingerprint scanners fall into one of the three general categories: optical, solid-state (e.g., capacitive, thermal, based on electric field, and piezoelectric), and ultrasound. Another classification of fingerprint scanners is based on the method of applying the fingertip to the scanner. In the first group, referred to as touch or area fingerprint scanners, the fingertip is applied to the sensor and then the corresponding digital image is acquired without relative movement of the fingertip over the sensor. In the second group, referred to as swipe, sweep, or slide fingerprint scanners, after applying the fingertip to the scanner, the fingertip is moved over the sensor so that the fingerprint pattern is scanned sequentially, row by row, and then the signal processing unit constructs an image of the fingerprint pattern from the scanned rows. Today, many low-cost and small-sized live-scan fingerprint scanners are available and used in various biometric systems.

Figure 6:
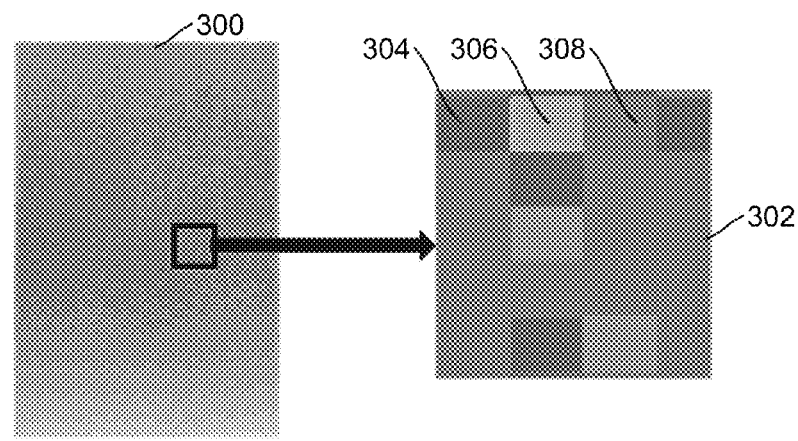
FIG. 6 shows an example of scanner imperfections.

Fingerprint scanners essentially convert the biometric information, i.e., the surface or subsurface of the skin of a fingertip, into one or several images. In practice, this conversion process can never be made perfect. The imperfections induced by the conversion process can be classified into two general categories: imperfections that largely do not change over time, which are hereinafter referred to as scanner pattern, and imperfections that change over time, which are hereinafter referred to as scanner noise. The scanner pattern stems from the intrinsic characteristics of the conversion hardware and software and is typically caused by the non-idealities and variability in the fingerprint sensor, but the signal processing unit and even the interface unit (see FIG. 1) can also contribute to it. The intrinsic characteristics that cause the scanner pattern remain relatively unchanged over time. Variations in these intrinsic characteristics, however, may still exist and may be caused by environmental changes such as changes in temperature, air pressure, and humidity; changes in the illumination; material aging; scratches, liquid permeability, and ESD impact on the sensor surface, etc. The scanner noise is generally caused by non-idealities in the conversion process that vary considerably within short periods of time. The scanner noise can be caused by thermal noise, which is typical for any electronic circuit, and/or by quantization noise, e.g., the signal distortion introduced in the conversion of an analog signal into a digital signal. An example of such imperfections is shown in FIG. 6. The image 300, shown on the left side of FIG. 6, is an image acquired with no object applied to the scanner platen. A small rectangular block of pixels from the image 300 is enlarged and shown on the right side of FIG. 6 as block 302. The three adjacent pixels 304, 306, and 308 of block 302 have different scales of the gray color: pixel 304 is darker than pixel 308 and pixel 306 is brighter than pixel 308.

Generally, a fingerprint scanner's pattern can be estimated from two types of images depending on the type of the object applied to the fingerprint scanner:

1. A predetermined, known a priori, object. Since the object is known, the differences (in the general sense) between the image acquired with the predetermined object and the theoretical image that would be acquired if the fingerprint scanner were ideal reveal the scanner pattern because the image does not contain a fingerprint pattern.

2. A fingertip of a person that, generally, is not known a priori. The acquired image in this case is a composition of the fingerprint pattern, the scanner pattern, and the scanner noise.

The scanner pattern is a sufficiently unique, persistent, and unalterable intrinsic characteristic of the fingerprint scanners even to those of exactly the same technology, manufacturer, and model. The methods and systems disclosed herein are able to distinguish the pattern of one scanner from the pattern of another scanner of exactly the same model by estimating the scanner pattern from a single image, acquired by each scanner. In this way, the scanner pattern can be used to enhance the security of a biometric system by authenticating the scanner, used to acquire a particular fingerprint image, and thus detect attacks on the scanner, such as to detect an image containing the fingerprint pattern of the legitimate user but acquired by another, unauthentic fingerprint scanner. This type of attack has become an important security threat as the widespread use of biometric technologies makes the biometric information essentially publicly available. The scanner pattern can also be used by itself as a source of randomness, unique for each scanner (and also for the system if the scanner is an integral part of it), that identifies the scanner, in other security applications, both already present today and in the future.

Generally, the process of matching involves the comparison of a sample of an important feature from an object under test (also known as query) with a stored template of the same feature representing its normal representation (also known as enrolled feature). One or more images can be used to generate the sample under test by using different methods. Similarly, one or more images can be used to generate the normal representation by using different methods. The performance of the match (as measured, for example, by scores) will depend on the number of images used for the sample, the number of images used to generate the normal representation, the signal processing, and the methods used for matching. These should be selected carefully as the best combination will vary depending on the device and the signal processing methodology used. In the context and applications of the present invention, it is possible to have the following sets of images that are being matched:

1. One enrolled image and one query image. The similarity score is computed between the scanner pattern of the enrolled image and the scanner pattern of the query image, which score is then compared with a threshold to make a decision.

2. Many enrolled images and one query image. In this case, the matching can be done in two ways:
  (a) The similarity scores between the scanner patterns in each pair {enrolled image, query image} are computed, and then these scores are averaged to produce a final similarity score, which average is then compared with a threshold to make a decision;
  (b) The scanner patterns of the enrolled images are computed and these scanner patterns are averaged to compute an average scanner pattern, which is then used to compute a similarity score with the scanner pattern of the query image. The resulting score is compared with a threshold to make a decision.

3. One or more enrolled images and many query images. Four cases can be defined:
  (a) The similarity scores between the scanner patterns in each pair {enrolled image, query image} are computed and then these scores are averaged to produce a final score, which is compared with a threshold to make a decision.
  (b) The scanner patterns of the enrolled images are computed and then they are averaged to compute an average scanner pattern, which is then used to compute similarity scores between the scanner patterns in each pair {average scanner of the enrolled images, the scanner pattern of a query image}. The resulting scores are then averaged, and this final score is compared with a threshold to make a decision.
  (c) The scanner patterns of the query images are computed and then they are averaged to compute an average scanner pattern, which is then used to compute similarity scores between the scanner patterns in each pair {scanner pattern of an enrolled image, average scanner pattern of the query images}. The resulting scores are then averaged, and this final score is compared with a threshold to make a decision.
  (d) The average scanner pattern of the enrolled images is computed and the average scanner pattern of the query images is computed. Then a similarity score between the two average patterns is computed, and this score is compared with a threshold to make a decision. The performance in this case, however, may be suboptimal because the number of common pixels in the two average patterns may be small.

D.1 Signal Models

The actual function describing the relationship among the scanner pattern, the scanner noise, and the fingerprint pattern (when present) can be very complex. It depends on the particular fingerprint sensing technology and on the particular fingerprint scanner design and implementation. Furthermore, even when the exact function is known, using it as a starting point for estimating the scanner pattern may prove difficult. However, this function can be simplified to a composition of additive/subtractive terms, multiplicative/dividing terms, and combinations of them by taking into account only the major contributing factors and by using approximations. This simple, approximate model of the actual function is henceforth referred to as the "signal model."

In developing signal models for capacitive fingerprint scanners, readily available commercial devices manufactured by UPEK, Inc. (Emeryville, Calif., USA) and Fujitsu (Tokyo, Japan), formerly Verdicom, Inc. (USA), were utilized. When the image, acquired with the fingerprint scanner, is not further enhanced by image processing algorithms to facilitate the biometric authentication or is enhanced but the scanner pattern information contained in it is not substantially altered, the pixel values g(i, j) of the image (as saved in a computer file) at row index i and column index j can be expressed as one of the two models:

a) Signal Model A:

$$g(i, j) = \frac{s(i, j)}{1 + s(i, j)f(i, j)} + n(i, j, t) \quad (1)$$

b) Signal Model B:

$$g(i, j) = \frac{s(i, j)}{1 + f(i, j)} + n(i, j, t) \quad (2)$$

where f(i, j) is the fingerprint pattern, s(i, j) is the scanner pattern, and n(i, j, t) is the scanner noise, which also depends on the time t because the scanner noise is time varying (by definition). All operations in Equations (1) and (2), i.e., the addition, the multiplication, and the division, are element by element (i.e., pixel by pixel) because the Point Spread Function of these fingerprint scanners, viewed as a two-dimensional linear space-invariant system, can be well approximated with a Dirac delta function. The range of g(i, j) is from 0 to 255 grayscale levels (8 bits/pixel), although some scanner implementations may produce narrower range of values. Signal Model A is better suited for the capacitive fingerprint scanners of UPEK, while Signal Model B is better suited for the capacitive fingerprint scanners of Fujitsu/Veridicom.

Commercial devices we used are currently sold by DigitalPersona, Inc. (Redwood City, Calif., USA), which in 2013 acquired the technology from Apple, Inc. (Cupertino, Calif., USA), which in turn in 2012 acquired AuthenTec, Inc. (formerly from Melbourne, Fla., USA), which in 2010 merged with UPEK, Inc. (formerly from Emeryville, Calif., USA), to which scanners henceforth we refer to as "UPEK scanners" as they are still known in the industry. We also used the capacitive fingerprint scanners sold by Fujitsu (Tokyo, Japan), which acquired the technology from Veridicom, Inc. (now defunct).

D.1.1 Signal Characteristics
D.1.1.1 Scanner Noise

Henceforth the term scanner noise is referred to the combined effect of time varying factors that result in short-time changes, i.e., within several seconds or faster, in consecutively acquired images under the same acquisition conditions (e.g. the fingertip applied to the scanner is not changed in position, in the force with which the fingertip is being pressed to the scanner platen, or in moisture) and the same environmental conditions (e.g., without change in the temperature, humidity, or air pressure). Examples for such factors, contributing to the scanner noise, are the thermal noise, which is present in any electronic circuit, and the quantization noise, which is the distortion introduced during the conversion of an analog signal into a digital signal.

Viewed as a one-dimensional signal represented by a function of time t, the scanner noise can be well approximated by: (i) as having a Gaussian distribution with zero mean $N(0, \sigma_n^2)$; and (ii) as being white, i.e., its autocorrelation function in the time domain is the Dirac delta function. It has been estimated that the scanner noise variance $\sigma_n^2$ is about 1.8 for Scanner Model A and about 1.0 for Scanner Model B.

D.1.1.2 Scanner Pattern

Because of the presence of scanner noise, which is time varying, it is possible to only estimate the scanner pattern. The scanner pattern, viewed as a two-dimensional random process, i.e., a random process dependent on two independent spatial variables, can be well approximated by a Gaussian random field, i.e., with a two-dimensional random variable that has a Gaussian distribution $N(\mu_s, \sigma_s^2)$, where $\mu_s$ is the mean and $\sigma_s^2$ is the variance of the scanner pattern. This random field is not necessarily stationary in the mean, i.e., the mean $\mu_s$ may vary across one and the same image (e.g., as a gradient effect). The scanner pattern may also change roughly uniformly (e.g., with an approximately constant offset) for many pixels across the scanner platen among images acquired with the same fingerprint scanner under different environmental conditions, e.g., under different temperatures and/or different moisture (i.e., water). Because of the variable mean $\mu_s$ and this (nonconstant) offset that is dependent on the environment, the absolute value of the scanner pattern may not be well suited for authenticating the scanner and may create problems for the signal processing. We incorporate these effects in the following model of the scanner pattern s(i, j) as a sum of two components:

$$s(i,j) = \mu_s(i,j) + s_v(i,j).$$

The first component, $\mu_s(i, j)$, is the mean of the scanner pattern. It varies slowly in space (i.e., across the scanner platen) but may (considerably) change over time in the long term and also under different environmental conditions and other factors. As it is not reliably reproducible, it is difficult to be used as a persistent characteristic of each scanner and, therefore, it needs to be removed from consideration; its effect can be mitigated and in certain cases completely eliminated. The second component, $s_v(i, j)$, rapidly varies in space but is relatively invariant in time (both in the short term and in the long term) and under different environmental conditions. This variable part $s_v(i, j)$ of the scanner pattern mean does not change significantly and is relatively stable under different conditions. It is sufficiently reproducible and can serve as a persistent characteristic of the scanner. Furthermore, it determines the variance $\sigma_s^2$, which, therefore, is relatively constant. This type of permanence of the scanner pattern is a key element of the exemplary implementations disclosed herein.

In addition to the variable mean and offset, however, the scanner pattern s(i, j) may also exhibit other deviations from the theoretical Gaussian distribution, such as outliers (e.g., beyond $\pm 3 \cdot \sigma_s^2$ around the mean) and heavy tails. A specific peculiarity that can also be attributed as scanner pattern is malfunctioning (i.e., "dead") pixels that produce constant pixel values regardless of the object applied to the scanner platen at their location; the pixel values they produce, however, may also change erratically. All these effects required robust signal processing as the methods and systems disclosed herein.

The scanner pattern, viewed as a two-dimensional random process, i.e., a random process dependent on two independent spatial variables, can be well approximated by a Gaussian random field, i.e., with the two-dimensional random variable having a Gaussian distribution $N(\mu_s, \sigma_s^2)$, where $\mu_s$ is the mean and $\sigma_s^2$ is the variance of the scanner pattern. This random field may not be stationary in the mean, i.e., the mean $\mu_s$ may change across one and the same image (like a gradient effect) and among different images acquired with the same fingerprint scanner under different environmental conditions, e.g., under different temperatures or different moistures of the fingertip skin. The effect of this nonstationarity, however, can be mitigated and in certain cases completely eliminated. For each fingerprint scanner, the variations around this mean do not change significantly and are relatively stable under different conditions (thus, the variance $\sigma_s^2$ is relatively constant). This type of permanence of the scanner pattern is a key element of the exemplary implementations.

The mean $\mu_s$ and the variance $\sigma_s^2$ of the scanner pattern are critical parameters and they can be determined in two ways:

One or both of the parameters are computed before the fingerprint scanner is put in operation, i.e., they are predetermined and fixed to typical values that are computed by analyzing a single image or multiple images of the same fingerprint scanner or a batch of scanners of the same type and model;

One or both of the parameters are computed dynamically during the normal operation of the fingerprint scanner by analyzing a single image or multiple images of the same fingerprint scanner. Since these computed values will be closer to the actual, true values of the parameters for a particular fingerprint scanner, the overall performance may be higher than in the first method. However, this increase in the performance may come at higher computational cost and weaker security.

Nevertheless, both ways of computing either one of the parameters, i.e., the scanner pattern mean or the scanner pattern variance, leads to computing estimates of the actual, true values of these parameters because of two reasons: (i) the scanner pattern itself is a random field for which only a finite amount of data, i.e., image pixels, is available, and (ii) there is a presence of scanner noise, which is a time-varying random process.

D.1.1.2.1 Estimation of the Scanner Pattern Mean and Variance

Estimates of the scanner pattern mean and scanner pattern variance can be computed from a single image or multiple images acquired with a predetermined object applied to the scanner platen. The preferred predetermined object for Signal Model A and Signal Model B is air, i.e., no object is applied to the scanner platen, but other predetermined objects are also possible, e.g., water. When the object is predetermined, i.e., not a fingertip of a person, then $f(i, j)=0$. Furthermore, for either one of the signal models, the pixel value at row index i and column index j of an image acquired with a predetermined object applied to the scanner is:

$$g^{(po)}(i,j)=s(i,j)+n(i,j,t). \quad (3)$$

Averaging many pixel values $g^{(po)}(i, j)$ acquired sequentially with one and the same fingerprint scanner will provide the best estimate of the scanner pattern $s(i, j)$, because the average over time of the scanner noise $n(i, j, t)$ at each pixel will tend to 0 (according to the law of large numbers), because with respect to time the scanner noise is a zero-mean random process. Thus, if $g_k^{(po)}(i, j)$ is the pixel value of the k-th image acquired with a particular fingerprint scanner, then the estimate of the scanner pattern $s(i, j)$ at row index i and column index j is:

$$\hat{s}(i, j) = \frac{1}{K} \sum_{k=1}^{K} g_k^{(po)}(i, j) \quad (4)$$

where K is the number of images used for averaging (K can be as small as ten). Then, an estimate $\bar{s}$ of the mean $\mu_s$ of the scanner pattern can be computed using the formula for the sample mean:

$$\bar{s} = \frac{1}{I \cdot J} \sum_{i=1}^{I} \sum_{j=1}^{J} \hat{s}(i, j) \quad (5)$$

where I is the total number of rows and J is the total number of columns in the image. The estimate $\hat{\sigma}_s^2$ of the scanner pattern variance $\sigma_s^2$ then can be computed using:

$$\hat{\sigma}_s^2 = \frac{1}{I \cdot J} \sum_{i=1}^{I} \sum_{j=1}^{J} (\hat{s}(i, j) - \bar{s})^2. \quad (6)$$

Instead of the biased estimate in Equation (6), it is also possible to compute the unbiased estimate by dividing by (I−1)(J−1) instead of by (iJ) as in Equation (6):

$$\hat{\sigma}_s^2 = \frac{1}{(I-1) \cdot (J-1)} \sum_{i=1}^{I} \sum_{j=1}^{J} (\hat{s}(i, j) - \bar{s})^2. \quad (7)$$

However, since the mean $\mu_s$ of the scanner pattern is not stationary and also depends on the temperature and the humidity, using $\bar{s}$ in the computation of the estimate of the scanner pattern variance may be suboptimal. Therefore, it is better to compute the local estimates $\hat{\mu}_s(i, j)$ of the sample mean of the scanner pattern for each pixel at row index i and column index j by averaging the pixel values in blocks of pixels:

$$\hat{\mu}_s(i, j) = \frac{1}{L \cdot R} \sum_{l=-\lfloor \frac{L}{2} \rfloor}^{\lfloor \frac{L-1}{2} \rfloor} \sum_{r=-\lfloor \frac{R}{2} \rfloor}^{\lfloor \frac{R-1}{2} \rfloor} \hat{s}(i+l, j+r) \quad (8)$$

where the integers L and R define the dimensions of the block over which the local estimate is computed and $\lfloor \cdot \rfloor$ is the floor function (e.g., $\lfloor 2.6 \rfloor=2$ and $\lfloor -1.4 \rfloor=-2$). Setting L and R in the range from about 5 to about 20 yields the best performance, but using values outside this range is also possible. When the index (i+l) or the index (j+r) falls outside the image boundaries, the size of the block is reduced to accommodate the block size reduction in the particular computation; i.e., fewer pixels are used in the sums in Equation (8) for averaging to compute the corresponding local estimate $\hat{\mu}_s(i, j)$.

In another exemplary implementation, the local estimate $\hat{\mu}_s(i, j)$ of the sample mean $\mu_s$ is computed in a single dimension instead of in two dimensions (i.e., in blocks) as in Equation (8). This can be done along rows, along columns, or along any one-dimensional cross section of the image. For example, computing the local estimate $\hat{\mu}_s(i, j)$ for each pixel with row index i and column index j can be done by averaging the neighboring pixels in the column j, reducing Equation (8) to:

$$\hat{\mu}_s(i, j) = \frac{1}{L} \sum_{l=-\lfloor \frac{L}{2} \rfloor}^{\lfloor \frac{L-1}{2} \rfloor} \hat{s}(i+l, j). \quad (9)$$

When the index (i+l) in Equation (9) falls outside the image boundaries, i.e., for the pixels close to the image edges, the number of pixels L used for averaging in Equation (9) is reduced to accommodate the block size reduction in the computation of the corresponding local estimate $\hat{\mu}_s(i, j)$.

Finally, the estimate $\hat{\sigma}_s^2$ of the scanner pattern variance $\sigma_s^2$ can be computed over all pixels in the image using the following Equation (10):

$$\hat{\sigma}_s^2 = \frac{1}{I \cdot J} \sum_{i=1}^{I} \sum_{j=1}^{J} (\hat{s}(i,j) - \hat{\mu}_s(i,j))^2. \quad (10)$$

Instead of the biased estimate of the variance of the scanner pattern as given in Equation (10), it is also possible to compute an unbiased estimate by dividing by $(I-1)(J-1)$ instead of by $(I \cdot J)$ as in Equation (10):

$$\hat{\sigma}_s^2 = \frac{1}{(I-1) \cdot (J-1)} \sum_{i=1}^{I} \sum_{j=1}^{J} (\hat{s}(i,j) - \hat{\mu}_s(i,j))^2. \quad (11)$$

In another exemplary implementation, the estimate $\hat{\sigma}_s^2$ of the scanner pattern variance $\sigma_s^2$ can be computed using only some of the pixels in the image, not all pixels as in Equation (10) or Equation (11). For example, the averaging in these equations can be done only over a block of pixels, only along predetermined rows, only along predetermined columns, only along predetermined cross-sections of the image, or any combinations of these. This approach may decrease the accuracy of the estimate $\hat{\sigma}_s^2$, but it may be beneficial because it will reduce the requirements for computational power.

The estimate $\hat{\sigma}_s^2$ of the scanner pattern variance depends on the particular fingerprint scanner and the particular signal model used in the approximation. For Signal Model A, the estimate $\hat{\sigma}_s^2$ typically falls in the range from about 10 to about 40, and for Signal Model B, it typically falls in the range from about 7 to about 17. Furthermore, because of the specificity of the sensing process for each type of fingerprint scanner and the particular hardware and software design of each type and model of fingerprint scanner, the estimates $\hat{\sigma}_s^2$ for one and the same scanner when computed over blocks of pixels, over columns of pixels and over rows of pixels may differ from one another.

To compute the local mean estimate $\hat{\mu}_s(i,j)$, we used a 11-tap moving-filter along columns, i.e., $L=11$ in Equation (9). Using it, for Signal Model A, we found that the estimate $\hat{\sigma}_s^2$ typically falls in the range from about 12 to about 20, with an average of about 15.4, and for Signal Model B from about 7 to about 17, with an average of about 8.6.

The estimate $\bar{s}$ of the mean $\mu_s$ of the scanner pattern and the local estimates $\hat{\mu}_s(i,j)$ may depend on the particular scanner and the conditions under which they are estimated (e.g., temperature and humidity). The local estimates $\hat{\mu}_s(i,j)$ also change across the image area, i.e., they are not constant as functions of the indices i and j. The estimate $\bar{s}$ and $\hat{\mu}_s(i,j)$ also depend on the signal model, and for Signal Model A they are in the range from about 150 to about 220 grayscale levels, and for Signal Model B in the range from about 200 to about 250 grayscale levels.

A disadvantage of this approach for estimating the scanner pattern variance is that it requires additional images acquired with a predetermined object applied to the scanner platen. This may require that during the scanner enrolment two groups of images be acquired: one group with a predetermined object applied to the scanner and another group with user's fingerprint applied to the scanner. This may increase the needed computational time and may weaken the security as the legitimate scanner may be replaced between the acquisitions of the two groups of images. It was determined that about 10 images acquired with a predetermined object applied to the scanner pattern are sufficient for an accurate estimate of the scanner pattern variance.

The above described exemplary implementations for estimating the scanner pattern mean and variance can be done either during the scanner enrolment or prior to the scanner enrolment.

In one exemplary implementation, the estimate of the scanner pattern variance in the case when it is computed and set before a particular fingerprint scanner is put in operation is computed by averaging the estimates of the scanner pattern variances of a batch of M scanners. Thus, if $\hat{\sigma}_{s,m}^2$, is the estimate of the scanner pattern variance of the m-th scanner in the batch, then the average estimate of the scanner pattern variance is:

$$\hat{\sigma}_s^2 = \frac{1}{M} \sum_{m=1}^{M} \hat{\sigma}_{s,m}^2. \quad (12)$$

Equation (12) has been used to determine that a sufficiently accurate estimate $\hat{\sigma}_s^2$ of the scanner pattern variance for Signal Model A is about 28 and for Signal Model B about 12.

Furthermore, separating the variable part of the scanner pattern from the scanner noise is virtually impossible because both of them are approximately Gaussian processes and for the methods disclosed herein of importance is the total variance of the scanner pattern and the scanner noise. Our analysis showed that this total variance is approximately equal to the sum of $\hat{\sigma}_s^2$ and $\hat{\sigma}_n^2$, and for Signal Model A, it is from about 13.5 to about 21, with an average about 17, and for Signal Model B about 9.4 on average.

Computing and using an accurate estimate of the scanner pattern variance is important, but the method and apparatus disclosed in the exemplary implementations are sufficiently robust against wide deviations of the estimate $\hat{\sigma}_s^2$ from the true value of the scanner pattern variance $\sigma_s^2$, i.e., the overall performance remains relatively unchanged.

D.1.1.2.2 Scanner Pattern Spatial Dependence

The random field of the scanner pattern $s(i,j)$ can be modeled as white, i.e., either its one-dimensional or its two-dimensional autocorrelation function can be well approximated by Dirac delta functions, one-dimensional or two-dimensional, respectively. The accuracy of this model depends on the particular signal model. This accuracy is also different along the two main axes of the two-dimensional autocorrelation function due to specifics in the hardware and software implementations of the particular fingerprint scanner type and model, including but not limited to its sensing technology and the addressing of its sensing elements. For example, for Signal Model A, the two-dimensional autocorrelation function is typically closer to the Dirac delta function along its column axis than along its row axis. The two-dimensional autocorrelation function of Signal Model B is typically as close to the Dirac delta function along its column axis as it is along its row axis.

D.1.1.3 Fingerprint Pattern

Henceforth we refer to the two-dimensional function $f(i,j)$ as introduced in Equation (1) for Signal Model A and in Equation (2) for Signal Model B as a fingerprint pattern.

The surface of the fingertip skin is a sequence of ridges and valleys. This surface is read by the fingerprint scanner and represented as a two-dimensional signal via a process called image acquisition. Along with other imperfections introduced by the fingerprint scanner in this representation, the acquisition process may also include nonlinear transformations, such as the projection of the three-dimensional fingertip onto the two-dimensional scanner platen and the sensing process that reads the ridges and valleys and converts these readings into electrical signals, which signals are further processed and converted into a digital image. As result of such nonlinear transformations, the fingerprint pattern f(i, j) may become a nonlinear function of the actual surface of the fingertip skin.

Figure 7:
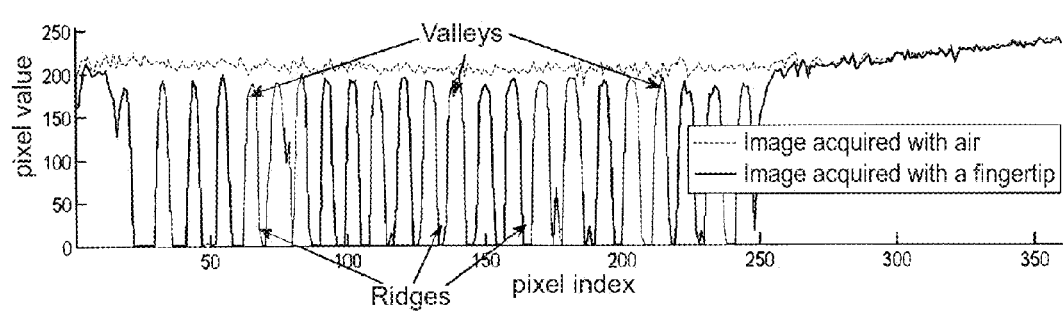
FIG. 7 shows columns of pixels from two images: one acquired with air and another one acquired with a fingertip applied to the scanner platen.

The fingerprint pattern f(i, j) can be roughly viewed as one dominant, single-frequency sinusoid and its harmonics. The frequency of this sinusoid depends on the width of the ridges and valleys, which are individual for every person. This frequency also depends on the particular type of finger (e.g., thumbs usually have wider ridges and valleys than little fingers have), on the gender (male fingers typically have wider ridges and valleys than female fingers have) and on the age (adults usually have wider ridges and valleys than children have). A sinusoid with frequency of about 0.63 radians per pixel is sufficiently representative for modeling purposes in the context of the exemplary implementations. FIG. 7 is a representative figure depicting the pixel values (in grayscale levels) of a column of pixels from two images: one image acquired with no object applied to the scanner platen (i.e., with air), shown in dashed gray curve, and another image acquired with a fingertip applied to the scanner platen, shown in solid black curve. The regions that correspond to valleys and to ridges in the image acquired with a fingertip applied to the scanner platen are also shown.

One important observation in FIG. 7 is that the pixel values in certain ridges are constant (equal to grayscale level 1), i.e., the scanner becomes saturated and the signal "clips." We observed that this saturation can be due to several reasons: (a) strong pressure of the fingertip to the scanner platen (which is typical for thumb fingers as they are stronger), (b) wide ridges (also typical for thumbs and to some extent for the middle fingers as they are naturally larger than the other fingers), and (c) highly moisturized fingers. While this saturation of the signal to 1 is not a problem for the fingerprint recognition, estimating the scanner pattern from such saturated regions is impossible and, therefore, it is very important that such regions are excluded from further processing, as the methods and systems herein disclosed do.

The range of the fingerprint pattern f(i, j), as it is introduced in Equations (1) and (2), is (0, 1]. The pixel values g(i, j) of the image at row index i and column index j for the two general regions of the fingertip skin, ridges and valleys, neglecting the scanner noise n(i, j, t), are approximately as follows:

In the regions with ridges, f(i, j) is close to 1. Thus:
for Signal Model A:

$$g^{(r)}(i, j) \approx \frac{s(i, j)}{1 + s(i, j)} + n(i, j, t) \approx 1 + n(i, j, t)$$

for Signal Model B:

$$g^{(r)}(i, j) \approx \frac{s(i, j)}{1 + 1} + n(i, j, t) \approx \frac{s(i, j)}{2} + n(i, j, t)$$

In the regions with valleys, f(i, j) is close to 0. Thus:
for Signal Model A:

$$g^{(v)}(i, j) \approx \frac{s(i, j)}{1 + 0} + n(i, j, t) \approx s(i, j) + n(i, j, t)$$

for Signal Model B:

$$g^{(v)}(i, j) \approx \frac{s(i, j)}{1 + 0} + n(i, j, t) \approx s(i, j) + n(i, j, t)$$

Therefore, in the regions with valleys, for either one of the signal models (see Equation (3)):

$$g^{(v)}(i,j) \approx s(i,j) + n(i,j,t) = g^{(po)}(i,j). \tag{13}$$

D.2 Signal Processing Modules

Figure 8:
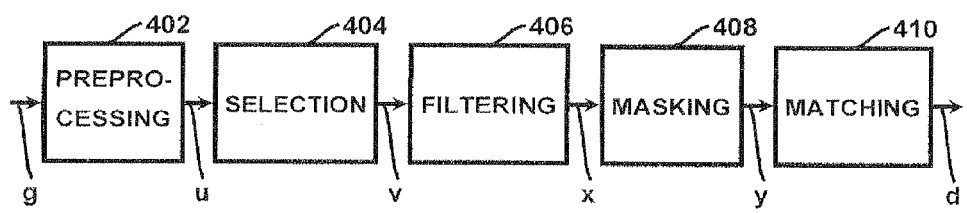
FIG. 8 is a conceptual signal flow diagram of operation of the signal processing modules.

FIG. 8 shows a conceptual diagram of the sequence of signal processing modules in which the signal g, the image, is processed to produce the signal d, the scanner verification decision, along with the interface signals among them. The signals between the consecutive modules in FIG. 8 represent only the main input signal and the main output signal of each module. Different implementations of each module may use other signals as inputs than those shown in FIG. 8; those additional signals are specified in the corresponding description of each module in question.

D.2.1 Preprocessing Module

The Preprocessing Module is shown as block 402 in FIG. 8, and has an input signal g, which represents the pixel values g(i, j) of the image, and a signal output u, which is a two-dimensional signal with the same size as g.

Equations (1) and (2) model the relationship between the scanner pattern s(i, j) and the fingerprint pattern f(i, j). Because of the division and the multiplication operations in them, directly separating s(i, j) from f(i, j) is difficult. In order to facilitate this separation, the pixel values g(i, j) in the image can be inverted. Thus, for every row index i and column index j, we define h(i, j):

$$h(i, j) \triangleq \begin{cases} \dfrac{1}{g(i, j)} & \text{for } g(i, j) \neq 0 \\ 1 & \text{for } g(i, j) = 0 \end{cases} \tag{14}$$

This inversion applied to Signal Model A transforms differently the relationship between the scanner pattern and the fingerprint pattern from the same inversion applied to Signal Model B, but the end result of the inversion for the regions with valleys is very similar for the two signal models because (a) the magnitude of scanner noise n(i, j, t) is mostly about 2 grayscale levels and thus is much weaker than the scanner pattern s(i, j), which makes the effect of the scanner noise negligible, and (b) the value of the scanner pattern f(i, j) in the regions with valleys is close to 0. Thus, for Signal Model A, $$h(i, j) = \frac{1}{\frac{s(i, j)}{1 + s(i, j) \cdot f(i, j)} + n(i, j, t)} \approx \frac{1}{s(i, j)} + f(i, j) \tag{15}$$

and for Signal Model B, $$h(i, j) = \frac{1}{\frac{s(i, j)}{1 + f(i, j)} + n(i, j, t)} \approx \frac{1}{s(i, j)} + \frac{f(i, j)}{s(i, j)}. \tag{16}$$

Since the mean $\mu_s$ of the scanner pattern s(i, j) is much larger than its standard deviation $\sigma_s$, the variations of the scanner pattern s(I, j) about its mean $\mu_s$ are small. Therefore, the term $$\frac{f(i, j)}{s(i, j)}$$

in Equation (16) is approximately equal to $$\frac{f(i, j)}{\mu_s},$$

which means that the fingerprint pattern f(i, j) essentially is simply scaled down by a constant factor $\mu_s$, but its waveform shape as such is preserved; we refer to this scaled down version of the fingerprint pattern as f'(i, j). Hence, using this approximation, Equation (16) becomes similar to Equation (15) and it is:

$$h(i,j) \approx \frac{1}{s(i,j)} + \frac{f(i,j)}{\mu_s} \approx \frac{1}{s(i,j)} + f'(i,j). \quad (17)$$

Because of its importance in the analysis that follows, we also define t(i, j) as the inverse of the scanner pattern:

$$t(i,j) \triangleq \frac{1}{s(i,j)}. \quad (18)$$

Thus, by applying the signal inversion of Equation (14), the multiplicative relationship between the scanner pattern s(i, j) and the fingerprint pattern f(i, j) in Equations (1) and (2) is transformed into a sum of two terms, one of which represents the scanner pattern and the other one—the fingerprint pattern:

$$h(i,j) \approx t(i,j) + f(i,j). \quad (19)$$

This makes their separation possible using simple linear signal processing. In addition, we developed a Gaussian approximation for the inverse of a Gaussian random variable, according to which t(i, j) has approximately a Gaussian distribution $N(\mu_t, \sigma_t^2)$ with $$\mu_t = \frac{1}{\mu_s} \quad (20)$$

and $$\sigma_t^2 = \frac{\sigma_s^2}{\mu_s^4}$$

where $\mu_s$ is the mean and the $\sigma_s^2$ is the variance of the scanner pattern s(i, j). This approximation is sufficiently accurate when $\mu_s > 100$ and $\mu_s \gg \sigma_s$, both of which hold true for both signal models. Using the range of values for the scanner pattern mean $\mu_s$ and standard deviation $\sigma_s$ for Signal Model A, $\mu_t$ falls in the range from about $4.54 \cdot 10^{-3}$ to about $6.67 \cdot 10^{-3}$ with a typical value of about $5.0 \cdot 10^{-3}$, and $\sigma_t$ falls in the range from about $0.65 \cdot 10^{-4}$ to about $2.81 \cdot 10^{-4}$ with typical value of about $1.32 \cdot 10^4$. For Signal Model B, $\mu_t$ falls in the range from about $4.0 \cdot 10^{-3}$ to about $5.0 \cdot 10^{-3}$ with a typical value of about $4.54 \cdot 10^{-3}$, and $\sigma_t$ falls in the range from about $0.42 \cdot 10^{-4}$ to about $1.03 \cdot 10^{-4}$ with typical value of about $0.72 \cdot 10^{-4}$.

Because of the inevitable presence of scanner noise, which we have neglected in the discussion about the inversion above, of importance for the signal processing of the pixels in the valleys is not the variance $\sigma_s^2$ of the scanner pattern alone, but the variance of the combined scanner pattern and spatial scanner noise. Since the scanner pattern and the spatial scanner noise can both be assumed to be approximately Gaussian, their sum is also approximately Gaussian, and, therefore, the inversion approximation is still applicable but has to be used with the sum of their variances, i.e., $\sigma_s^2 + \sigma_n^2$.

In summary, the problem of separating the scanner pattern and the fingerprint pattern, which are in a complex relationship with each other, is thus reduced to separating a Gaussian signal from an additive, roughly sinusoidal signal, which can be done in a straight forward and computationally-efficient way. Because of this simplification, the signal modeling in Equations (1) and (2) and the signal inversion in Equation (14) are key elements of the exemplary implementations described herein. Two downsides of this inversion, however, are that (a) it may require care in implementing the signal processing modules in digital precision-limited systems, e.g., with fixed-point arithmetic, because of possible roundoff errors and possible limit cycles, and (b) it may also create other types of nonlinear effects.

In an alternative exemplary implementation, the Preprocessing Module does not perform signal inversion, and its signal output is simply equal to its signal input:

$$u(i,j) = g(i,j). \quad (21)$$

In this case, in the regions of valleys, i.e., where the fingerprint pattern f(i, j) is almost equal to 0, for both signal models (see Equation (13)):

$$g(i,j) \approx s(i,j). \quad (22)$$

Therefore, the scanner pattern s(i, j) can be easily recovered in the regions with valleys. However, the fingerprint pattern f(i, j) is so close to zero as to make the approximation in Equation (22) sufficiently accurate only for a very small part of the image. Thus, in this case, the subsequent signal processing modules may use only that part of the image for which the approximation in Equation (22) is sufficiently accurate or use a larger part of the image where the approximation is not. Our study showed that either approach degrades the overall performance.

In summary, the Preprocessing Module has two modes of operation:
a) Direct mode: u(i, j) = g(i, j)
b) Inverse mode:

$$u(i,j) = h(i,j) = \frac{1}{g(i,j)}$$

The preferred implementation uses the inverse mode of the Preprocessing Module.

D.2.2 Selection Module

The Selection Module is shown as block 404 in FIG. 8. It selects part of the pixels from its input signal u, which represents the pixel values u(i, j) of the image, and produces this selection as output signal v to be processed further in the subsequent modules. This output signal defines regions of interest. This selection is necessary because (a) selecting part of the pixels from all pixels in the image in a particular order provides a signal with statistical characteristics that facilitates the subsequent signal processing and (b) using only part of all pixels minimizes the computations, thus decreases the required computational time of the whole algorithm or, alternatively, relaxes the design requirements for computational power.

In another exemplary implementation when the Filtering Module uses Bypass Implementation, it is unnecessary to order the selected pixels (part or all of the image) and construct a one-dimensional signal because all processing in this exemplary implementation is pixel-wise and can be done on two-dimensional signals with the same efficiency as on the corresponding one-dimensional signals if constructed and used. Hence, the output signal v can be two dimensional as well as the signals x and y can be. The operations of the Masking Module and the Matching Module are then trivially extended to process these two-dimensional signals, and the similarity score and decision d will be exactly the same as in case of one-dimensional signals and processing.

One or many lines of pixels are selected from the two-dimensional input signal u to produce the one-dimensional signal output v. Thus, all subsequent signal processing is one dimensional. The output signal v consists of b line segments, concatenated one after each other, with each line segment having N elements and each element being a pixel value. The selected line or lines can be columns of pixels, rows of pixels, or diagonal lines of pixels.

D.2.2.1 Columns of Pixels

The one-dimensional autocorrelation function for Signal Model A along columns is very close to a Dirac delta function, which implies that the scanner pattern being read column-wise is close to a white sequence, i.e., it is only weakly correlated, and this facilitates the processing of the Filtering Module. The columns of pixels, as line segments, are concatenated in a sequence one after each other to form one line of pixels, which line becomes the output signal v. If the input signal u is an image with N rows and the first column of pixels to be included as the first line segment in the output signal v is column j of the input signal u, we denote this line segment as the vector $v_1$:

$$v_1 = \begin{bmatrix} u(1, j) \\ u(2, j) \\ \ldots \\ u(N, j) \end{bmatrix}.$$

Next, if the second column of pixels to be included as the second line segment in the output signal v is column k of the input signal u, we denote this line segment as the vector $v_2$:

$$v_2 = \begin{bmatrix} u(1, k) \\ u(2, k) \\ \ldots \\ u(N, k) \end{bmatrix}.$$

The other vectors $v_3$, $v_4$ ... $v_c$ where c is the number of columns to be concatenated, are formed in the same way, and their concatenation forms the output signal v:

$$v = \begin{bmatrix} v_1 \\ v_2 \\ \ldots \\ v_c \end{bmatrix}$$

which is a column vector with (c·N) elements, each element of which vector is a pixel value. In the preferred implementation, the selected columns are nonadjacent and about evenly spaced across the whole image area because (a) this type of selection reduces the statistical dependence among the selected pixels and (b) using pixels from all regions of the image ensures processing sufficient number of pixels with high quality estimates of the scanner pattern.

The Selection Module can have multiple implementations. In one implementation, all columns are selected. In another, only some of the columns are selected. The selected columns may be adjacent or not adjacent.

Selecting more columns is also possible as it can provide higher accuracy and robustness of the scanner authentication. Selecting only a few of all columns is the preferred implementation.

Yet in another exemplary implementation, only a few of all columns are selected. For example, for Signal Model A, selecting about 10 nonadjacent columns, each column containing 360 pixels, may be sufficient. Thus, the output signal v may contain about 3,600 pixels or only about 4% of the total 92,160 pixels in an image with 360 rows and 256 columns of pixels, greatly reducing the number of computations and computation time. This is the preferred implementation.

In another implementation, the columns of pixels may contain only a subset of the rows of the image. For example, it is possible to exclude the first several and the last several rows. Thus, if using only rows from 25 through 245, the line segments for each selected column j are of the form:

$$\begin{bmatrix} u(25, j) \\ u(26, j) \\ \ldots \\ u(245, j) \end{bmatrix}.$$

The overall performance in this case may be higher because the pixels in the regions close to the boundaries of the image may experience edge effects that are difficult to mitigate.

D.2.2.2 Rows of Pixels

Since the one-dimensional autocorrelation function along rows is not well approximated by a Dirac delta function, the pixels along rows exhibit non-negligible statistical dependence, and selecting and using them may degrade the overall performance. However, it is still possible to achieve good performance by selecting more pixels, i.e., greater number of rows.

The rows of pixels, as line segments, are concatenated in a sequence one after each other to form one line of pixels, which line becomes the output signal v. If the input signal u is an image with N columns and the first row of pixels to be included as the first line segment in the output signal v is row i of the input signal u, we denote this line segment as the vector $v_1$:

$$v_1 = [u(i,1) \, u(i,2) \ldots u(i,N)]^T$$

where the superscript $^T$ denotes matrix transposition. Next, if the second row of pixels to be included as the second line segment in the output signal v is row k of the input signal u, we denote this line segment as the vector $v_2$:

$$v_2 = [u(k,1) \, u(k,2) \ldots u(k,N)]^T$$

The other vectors $v_3$, $v_4$ ... $v_c$, where c is the number of rows to be concatenated, are formed in the same way, and their concatenation forms the output signal v:

$$v = \begin{bmatrix} v_1 \\ v_2 \\ \ldots \\ v_c \end{bmatrix}$$

which is a column vector with (c·N) elements, each element of which vector is a pixel value.

In another exemplary implementation of the Selection Module, all rows are selected. In another, only some of the rows are selected. The selected rows may be adjacent or not adjacent.

Yet in another exemplary implementation, only a few of all rows are selected. Similarly as in the case of columns of pixels, it is best to select rows that are nonadjacent and about evenly spaced across the whole image area because (a) this type of selection reduces the statistical dependence among the selected pixels and (b) using pixels from all regions of the image ensures processing sufficient number of pixels with high quality estimates of the scanner pattern. For example, for Signal Model A, we estimated that selecting about 20 rows is sufficient to ensure good overall performance.

Selecting more rows is also possible as it can provide higher accuracy and robustness of the scanner authentication. Selecting only a few of all rows is the preferred implementation.

The rows of pixels may contain only a subset of the columns of the image. For example, it is possible to exclude the first several and the last several columns. Thus, if using only columns from 10 through 246, the line segments for each selected column i are of the form:

$$r(i)=[u(i,10)\ u(i,11)\ \ldots\ u(i,246)]$$

The overall performance in this case may be higher because the pixels in the regions close to the boundaries of the image may experience edge effects that are difficult to mitigate.

D.2.2.3 Diagonal Lines of Pixels

In another exemplary implementation, the output signal v is constructed by taking lines of diagonal lines of the input signal u. For example, the diagonal lines of pixels can be constructed by taking lines parallel to the main diagonal of the matrix that represents the input signal u:

$$v_1 = \begin{bmatrix} u(4,1) \\ u(5,2) \\ u(6,3) \\ \ldots \\ u(259,256) \end{bmatrix};$$

$$v_2 = \begin{bmatrix} u(14,1) \\ u(15,2) \\ u(16,3) \\ \ldots \\ u(269,256) \end{bmatrix};$$

$$\ldots$$

$$v_{10} = \begin{bmatrix} u(94,1) \\ u(95,2) \\ u(96,3) \\ \ldots \\ u(349,256) \end{bmatrix}.$$

Then the output signal v is constructed by concatenating the column vectors $v_1, v_2, \ldots v_{10}$:

$$v = \begin{bmatrix} v_1 \\ v_2 \\ v_3 \\ \ldots \\ v_{10} \end{bmatrix}.$$

Similarly to selecting columns or rows of pixels, here also only a few or all lines of pixels in an image can be selected. Similarly, it is best to select lines that are nonadjacent and about evenly spaced across the whole image area. Selecting more lines can provide higher accuracy and robustness of the scanner authentication.

Selecting pixels from the input signal u can also be done in alternative ways that are not columns, rows, or diagonal lines of pixels, but are cross-sections of the image (e.g., cross the image).

Selecting pixels from the input signal u can be done in alternative ways. As long as the selection is done so that: (a) these pixels include pixels from regions with valleys, (b) the fingerprint pattern contained in the resulting output signal v has a "smooth" waveform, and (c) the statistical dependence in the scanner pattern contained in the resulting pixels is not significant, this will result in alternative implementations.

Figure 17:
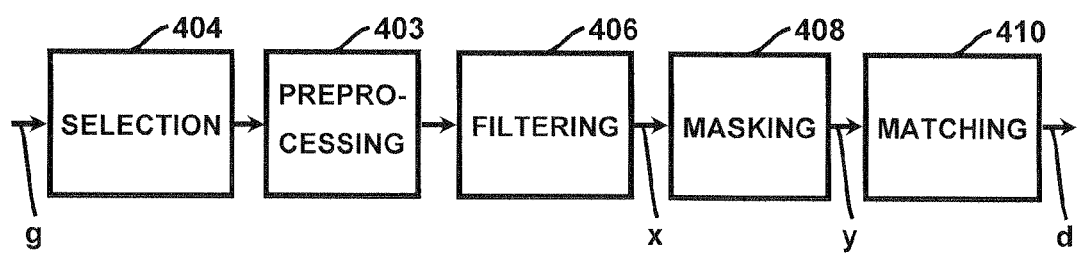
FIG. 17 is a conceptual signal flow diagram of operation of the signal processing modules of another method disclosed in the present invention.

In another exemplary implementation, shown in FIG. 17, the Preprocessing Module 403 operates after the Selection Module 404. In direct mode of the Preprocessing Module, the module does not alter in any way its input signal and therefore there is absolutely no change in the processing of the signals. In inverse mode of the Preprocessing Module, the pixel values are inverted after pixels are selected from the input image g, not before that as in the exemplary implementation shown in FIG. 8. This will reduce the number of computations because only selected pixels are inverted, not all pixels in the input image g. The processing performed in Preprocessing Module 403 is different than the processing performed in Preprocessing Module 402, in that Block 403 processes one dimensional signals while Block 402 processes two dimensional signals.

D.2.3 Filtering Module

The Filtering Module is shown as block 406 in FIG. 8. In one exemplary implementation, henceforth referred to as Bypass Implementation, the input signal v passes through the module unaltered, so that the output signal x is exactly the same as the input signal v.

In other implementations, the Filtering Module filters the input signal v to produce the output signal x, which signal x contains the scanner pattern. Because of the simplification detailed in the Preprocessing Module, this filtering is performed using simple linear signal processing and essentially comprises two operations: (1) a smoothing operation that smooths the input signal v and (2) a subtraction operation that subtracts this smoothed signal from the input signal v and produces the output signal x. Thus, a smoothing will also remove the (nonstationary) mean of the scanner pattern and yield only the variable part of it, from which a signal is derived and used in the Matching Module.

As a low-pass filter can be used for the smoothing operation (as disclosed herein), the combination of a smoothing operation and a subtraction operation is equivalent to high-pass filtering.

D.2.3.1 Padding and Windowing

The input signal v, which is the output of the Selection Module, is a column vector consisting of the successive concatenations of column vectors with count c, with each vector representing different columns, rows, or diagonal lines and each vector having N elements, each element of which being a pixel value, i.e., $$v = \begin{bmatrix} v_1 \\ v_2 \\ \ldots \\ v_c \end{bmatrix}. \quad (23)$$

Because of this construction of the input signal v, the signals in two adjacent vectors may be substantially different, creating a signal discontinuity at the place of the concatenation of the two vectors. The signal processing of this discontinuity and the use of pixels from one vector for signal processing in the vector adjacent to it may lead to unwanted artifacts, and, therefore, it is preferable that techniques are used to avoid this effect. Three such techniques are included in this disclosure, henceforth referred to as computation shortening, replica padding, and constant padding, although using other techniques is also possible. The replica padding method and constant padding method are specified below. The computation shortening method is specific for the particular implementation of the Filtering Module and specified in the appropriate sections (see sections D.2.3.2 and D.2.3.3).

Replica Padding

Each vector $v_i$, where i is an integer from 1 to c, is extended to include zero and negative indices and indices larger than N such that the added elements are symmetric about the first and the last indices of $v_i$:

$$v_i(j) = v_i(2-j) \quad \text{for } j \text{ from } \left(-\left\lfloor\frac{M}{2}\right\rfloor\right) \text{ to } 0 \qquad (24)$$

$$v_i(j) = v_i(2N-j) \quad \text{for } j \text{ from } (N+1) \text{ to } \left(N+\left\lfloor\frac{M-1}{2}\right\rfloor\right) \qquad (25)$$

The added elements in this extension can also be copies of the first and last elements, respectively, of the vector $v_i$ in the same order as they appear in $v_i$.

ii. Constant Padding

Each vector $v_i$, where i is an integer from 1 to c, is extended to include zero and negative indices and indices larger than N such that the added elements are set to constants. The constants can be the first and last elements, respectively, as follows:

$$v_i(j) = v_i(1) \quad \text{for } j \text{ from } \left(-\left\lfloor\frac{M}{2}\right\rfloor\right) \text{ to } 0 \qquad (26)$$

$$v_i(j) = v_i(N) \quad \text{for } j \text{ from } (N+1) \text{ to } \left(N+\left\lfloor\frac{M-1}{2}\right\rfloor\right). \qquad (27)$$

The constants can also be other numbers, such as 0 (the minimum grayscale level), 127 (the middle grayscale level), 255 (the maximum grayscale level), or any number in the range from 0 to 255. However, selecting constants that do not depend on the elements of the vector $v_i$ may lead to degraded overall performance.

Thus, each vector $v_i$, where i is an integer from 1 to c, from the input signal v (see Equation (23)) is processed separately, and the vectors that are the result of this processing are concatenated one after each other to form the output signal x.

Incorporating such techniques to avoid using pixels from one vector for signal processing in the vector adjacent to it may seem unjustified, but actually it is quite important. Because applying a fingertip tightly in the regions around the boundaries of the scanner platen area (and of the image in this respect) is difficult, the image pixels in these regions typically contain no fingerprint pattern. Hence, the estimate of the scanner pattern in these regions can be made very accurate if introduction of unwanted artifacts is avoided as detailed above.

Another important aspect of the processing in this module is using a windowing function applied to the signal being processed. By multiplying the pixel values by a windowing function (for example, see w(j) in Equation (29)), the pixels close to the current index of the signal being processed have higher weight in the computation. This is a method for controlling the level of the smoothing effect by placing larger weight on the pixels around the center pixel than on the distant pixels and thus reducing the effect of the latter.

The windowing function w(j) of size M, for j being an integer $$\text{from } -\left\lfloor\frac{M}{2}\right\rfloor \text{ to } \left\lfloor\frac{M-1}{2}\right\rfloor,$$

can be:

i a rectangular window (also known as Dirichlet window): w(j)=1 ii A triangular window (also known as Bartlett window):

$$w(j) = 2\left(1 - \frac{2}{M}|j|\right)$$

iii A Hann window (also known as Hanning or raised-cosine window):

$$w(j) = 1 + \cos\left(\frac{2j\pi}{M}\right)$$

iv A Hamming window:

$$w(j) = 2\left(0.54 + 0.46 \cdot \cos\left(\frac{2j\pi}{M}\right)\right)$$

V. A Gaussian window:

$$w(j) = 2 \cdot \exp\left(-\frac{1}{2}\left(\frac{j}{\frac{w_0(M-1)}{2}}\right)^2\right),$$

where $w_0$ is a suitably chosen value below 0.5.

Using other windowing functions is also possible. The windowing function of choice has to satisfy is the normalization condition:

$$\sum_{\substack{\text{for all } j \text{ for which} \\ w(j) \text{ is used}}} w(j) \approx M \qquad (28)$$

D.2.3.2 Low-Pass Filter Implementation of the Filtering Module

The smoothing operation in this implementation is performed by a low-pass filter whose cutoff frequency, order, and attenuation in the different frequency bands are optimized for best performance. This low-pass filter includes, but is not limited to, Butterworth, Chebyshev, elliptic, and Bessel filters and filters having finite impulse response (FIR) and filters having infinite impulse response (IIR).

The low-pass filter selected and described in this disclosure is the windowed moving-average filter because of the extreme implementation simplicity and the corresponding excellent overall performance. Let the vectors $v_i$, where i is an integer from 1 to c, are the vectors from the input signal v (see Equation (23)). Generally, for a pixel with index k sufficiently far from the beginning and end of this vector $v_i$, i.e., such that the index (k+j) does not address elements outside the vector $v_i$, the local mean $v_i^{(lm)}$ is computed by:

$$v_i^{(lm)}(k) = \frac{1}{M} \sum_{j=-\lfloor \frac{M}{2} \rfloor}^{\lfloor \frac{M-1}{2} \rfloor} w(j) \cdot v_i(k+j) \quad (29)$$

where M is a positive integer and determines the size of the moving-average window, w is a windowing function, and $\lfloor \cdot \rfloor$ is the floor function. Preferably, M is selected to be odd so that the window becomes symmetric about the index k, but selecting M to be even is also possible. Selecting M about 5 gives optimal results, but selecting values in the range from about 3 to about 7 is also possible. Using large values for M leads to better smoothing as large number of pixels are taken in the sum (see Equation (29)), but it also makes the estimate of the scanner pattern in the neighborhood of transition regions between valleys and ridges less accurate. Using small values for M leads to worse smoothing as small number of pixels are taken in the sum (see Equation (29)), which results in a less accurate estimate of the scanner pattern in the regions with valleys. Once the windowing function is selected, the size M of the moving-average window may need to be adjusted for achieving optimal overall performance.

For the pixels that are close to the beginning or the end of the vector $v_i$, three techniques for computing the local mean $v_i^{(lm)}$ are included in the present disclosure, although using other techniques is also possible:

i Computation Shortening

The sum in Equation (29) and the denominator in the coefficient in front of it are adjusted so that only elements of the vector $v_i$ are used in the computation. Thus, for the index k where $$k \leq \left\lfloor \frac{M}{2} \right\rfloor \text{ or } k \geq \left(N - \left\lfloor \frac{M-1}{2} \right\rfloor + 1\right),$$

the local mean vector $v_i^{(lm)}$ is computed by:

$$v_i^{(lm)}(k) = \frac{1}{(j_{max} - j_{min} + 1)} \sum_{j=j_{min}}^{j_{max}} w_k(j) \cdot v_i(k+j) \quad (30)$$

where $$j_{min} = \max\left(-\left\lfloor \frac{M}{2} \right\rfloor, 1-k\right) \text{ and } j_{max} = \min\left(\left\lfloor \frac{M-1}{2} \right\rfloor, n-k\right).$$

In this case, the windowing function depends on the index k because the window is truncated and needs to be normalized such that the sum of its elements equals $(j_{max}-j_{min}+1)$. Therefore, for all values of j from $j_{min}$ to $j_{max}$ as defined by Equation (30):

$$w_k(j) = \frac{(j_{max} - j_{min} + 1) \cdot w(j)}{M}, \quad (31)$$

where $$D = \sum_{j=j_{min}}^{j_{max}} w(j)$$

and w is the chosen windowing function. The computation shortening may lead to slight degradation in the accuracy of the local mean estimate for the pixels where it is applied to, but the distortion the computation shortening introduces is the smallest in comparison with the other methods.

ii Replica Padding

Each vector $v_i$ is extended to include zero and negative indices and indices larger than N as specified in Equations (24) and (25). The added elements in this extension can also be copies of the first and last elements, respectively, of the vector $v_i$ in the same order as they appear in $v_i$. Then the local mean vector $v_i^{(lm)}$ is computed using Equation (29).

iii Constant Padding

Each vector $v_i$ is extended to include zero and negative indices and indices larger than N as specified in Equations (26) and (27). Then the local mean vector $v_i^{(lm)}$ is computed using Equation (29).

Once the local mean vectors $v_i^{(lm)}$, where i is an integer from 1 to c, are computed, they are concatenated one after each other to form the local mean signal $v^{(lm)}$ (which is the smoothed signal):

$$v^{(lm)} = \begin{bmatrix} v_1^{(lm)} \\ v_2^{(lm)} \\ \ldots \\ v_c^{(lm)} \end{bmatrix}. \quad (32)$$

Finally, the output signal x of the Filtering Module in this implementation is the difference between the input signal v and the local mean signal $v^{(lm)}$:

$$x(k) = v(k) - v^{(lm)}(k) \quad (33)$$

where k is the current pixel index, an integer from 1 to (c·N).

D.2.3.3 Adaptive Wiener Filter Implementation of the Filtering Module

Herewith we incorporate a summary of the theory of Wiener filters as developed in Jae Lim, "Two-dimensional Image and Signal processing" for the one-dimensional case. Let a signal p(k) and an additive noise q(k), where k is an integer, are two zero-mean second-order stationary discrete-time random processes, linearly independent of each other, and the noisy observation r(k) is: r(k)=p(k)+q(k). The objective is finding that linear time-invariant (or space-invariant) filter with a possibly infinite and possibly non-causal impulse response b(k) such that the linear estimate p̂(k) given the observation r(k), i.e., p̂(k)=r(k)*b(k), is closest to the signal p(k) in mean-square error sense: $E[|p(k)-\hat{p}(k)|^2]$. The discrete-time Fourier transform of the linear time-invariant filter b(k) that minimizes the mean square error is:

$$B(\omega) = \frac{S_p(\omega)}{S_p(\omega) + S_q(\omega)},$$

where $S_p(\omega)$ and $S_q(\omega)$ are the power spectral densities of the signal p(k) and the noise q(k), respectively, and ω is the angular frequency. If p(k) and q(k) are Gaussian random processes, then the Wiener filter is also the optimal nonlinear mean-square error estimator.

In essence, the Wiener filter preserves the high SNR frequency components and suppresses the low SNR frequency components. If we define $$\rho(\omega) \triangleq \frac{S_p(\omega)}{S_q(\omega)}$$

to be the signal-to-noise ratio (SNR) in function of the frequency, then the Wiener filter transfer function is:

$$B(\omega) = \frac{\rho(\omega)}{\rho(\omega) + 1}.$$

At the frequencies where the signal is much stronger than the noise, i.e., where $\rho(\omega) \gg 1$, the transfer function is $B(\omega) \approx 1$, and the observation r(k) passes through the filter almost unchanged. On the other hand, the Wiener filter almost completely suppresses, i.e., $B(\omega) \approx 0$, the frequency components at which the signal is much weaker than the noise, i.e., where $\rho(\omega) \approx 0$. If the signal p(k) has a nonzero mean $\mu_p$ and the noise q(k) has a nonzero mean $\mu_q$, they have to be subtracted from the observation r(k) before the filtering it.

When the impulse response of the Wiener filter changes depending on the local characteristics of the signal being processed, the filter becomes time variant (or space variant). Thus, instead of using constant (for all indices k) power spectral densities for the signal and the noise, they can be estimated locally; furthermore, the means of the signal and the noise can be estimated locally as well. Depending on how these quantities are estimated, many variations are possible, but the simplest one is when the local power spectral densities of both the signal and the noise are constant in function of the frequency, i.e., the signal and the noise are "white." When the signal and the noise are zero mean, their power spectral densities are equal to their (local) variances:

$$S_p(\omega) = \sigma_p^2 \text{ and } S_q(\omega) = \sigma_q^2$$

where $\sigma_p^2$ and $\sigma_q^2$ are the variances of the signal and the noise, respectively. In this case, the frequency response of the Wiener filter is constant in function of the frequency, and thus its impulse response is a scaled Dirac delta function:

$$b(k) = \frac{\sigma_p^2}{\sigma_p^2 + \sigma_q^2} \delta(k)$$

where $\delta(k)$ is the Dirac delta function. Moreover, the filtering also depends on the relative relationship between the local variance of the signal and the noise: where the signal local variance $\sigma_p^2$ is smaller than the noise local variance $\sigma_q^2$, the filter suppresses the noise and thus the filter output is approximately equal to the local mean of the signal. On the other hand, where the signal local variance $\sigma_p^2$ is larger than the noise local variance $\sigma_q^2$, the filter leaves the input signal almost unchanged. Since the signal (local) variance is not known and generally is difficult to be estimated, in practice an estimate for the variance of the noisy observation r(k) is used instead because $\sigma_r^2 = \sigma_p^2 + \sigma_q^2$. Putting all things together yields the following expression for the estimate $\hat{p}(k)$ of the signal p(k);

$$\hat{p}(k) = \mu_p(k) + \frac{\max(0, \sigma_r^2(k) - \sigma_q^2)}{\max(\sigma_r^2(k), \sigma_q^2)} (p(k) - \mu_p(k)) \tag{5}$$

where $\sigma_r^2(k)$ is the local variance of the observation r(k), and $\mu_p(k)$ is the local mean of the signal p(k), which is also equal to the local mean $\mu_r(k)$ of the observation r(k) since the noise q(k) is zero mean. Assumed to be known is only the variance $\sigma_q^2$ of the noise; $\sigma_r^2(k)$ and $\mu_r(k)$ (and thus also $\mu_p(k)$) are estimated from the observation r(k). The output of the adaptive Wiener filter is the estimate $\hat{p}(k)$, which is a smoothed version of the signal AO.

Let the vectors $v_i$, where i is an integer from 1 to c, be the vectors from the input signal v (see Equation (23)). Each vector $v_i$ is processed separately in the following five steps:

D.2.3.3.1 Computing the Local Mean

Generally, for a pixel with index k sufficiently far from the beginning and the end of each vector $v_i$, i.e., such that the index (k+j) does not address elements outside the vector $v_i$, the local mean vector $v_i^{(lm)}$ is computed by:

$$v_i^{(lm)}(k) = \frac{1}{M} \sum_{j=-\lfloor \frac{M}{2} \rfloor}^{\lfloor \frac{M-1}{2} \rfloor} w(j) \cdot v_i(k+j) \tag{34}$$

where M is a positive integer and determines the size of the moving-average window, w is a windowing function, and $\lfloor \cdot \rfloor$ is the floor function. Preferably, M is selected to be odd so that the window becomes symmetric about the index k, but selecting M to be even is also possible. Selecting M about 3 gives optimal results, but selecting values in the range from about 2 to about 7 is also possible. Once the windowing function is selected, the size M of the moving-average window may need to be adjusted for achieving optimal overall performance.

For the pixels that are close to the beginning or the end of the vector $v_i$, three techniques for computing the local mean $v_i^{(lm)}$ are included in the exemplary implementations, although using other techniques is also possible:

i Computation Shortening

The sum in Equation (34) and the denominator in the coefficient in front of it are adjusted so that only elements of the vector $v_i$ are used in the computation. Thus, for the index k where $$k \leq \left\lfloor \frac{M}{2} \right\rfloor \text{ or } k \geq \left( N - \left\lfloor \frac{M-1}{2} \right\rfloor + 1 \right),$$

the local mean vector $v_i^{(lm)}$ is computed by:

$$v_i^{(lm)}(k) = \frac{1}{(j_{max} - j_{min} + 1)} \sum_{j=j_{min}}^{j_{max}} w_k(j) \cdot v_i(k+j) \tag{35}$$

where $$j_{min} = \max\left(-\left\lfloor \frac{M}{2} \right\rfloor, 1-k\right) \text{ and } j_{max} = \min\left(\left\lfloor \frac{M-1}{2} \right\rfloor, N-k\right)$$

In this case, the windowing function depends on the index k because the window is truncated and needs to be normalized such that the sum of its elements equals $(j_{max}-j_{min}+1)$. Therefore, for all values of j from $j_{min}$ to $j_{max}$ as defined by Equation (35):

$$w_k(j) = \frac{(j_{max} - j_{min} + 1) \cdot w(j)}{M}, \text{ where } D = \sum_{j=j_{min}}^{j_{max}} w(j) \quad (36)$$

and w is the chosen windowing function. The computation shortening may lead to slight degradation in the accuracy of the local mean estimate for the pixels where it is applied to, but the distortion the computation shortening introduces is the smallest in comparison with the other methods.

ii Replica Padding

Each vector $v_i$ is extended to include zero and negative indices and indices larger than N as specified in Equations (24) and (25). The added elements in this extension can also be copies of the first and last elements, respectively, of the vector $v_i$ in the same order as they appear in $v_i$. Then the local mean vector $v_i^{(lm)}$ is computed using Equation (34).

iii Constant Padding

Each vector $v_i$ is extended to include zero and negative indices and indices larger than N as specified in Equations (26) and (27). Then the local mean vector $v_i^{(lm)}$ is computed using Equation (34).

D.2.3.3.2 Computing the Local Square

Generally, for a pixel with index k sufficiently far from the beginning and the end of each vector $v_i$, i.e., such that the index (k+j) does not address elements outside the vector $v_i$, the local square vector $v_i^{(lm)}$ is computed by:

$$v_i^{(ls)}(k) = \frac{1}{M} \sum_{j=-\lfloor \frac{M}{2} \rfloor}^{\lfloor \frac{M-1}{2} \rfloor} w(j) \cdot v_i^2(k+j) \quad (37)$$

where M is a positive integer and determines the size of the moving-average window, w is a windowing function, and $\lfloor \cdot \rfloor$ is the floor function. Preferably, M is selected to be odd so that the window becomes symmetric about the index k, but selecting M to be even is also possible. Selecting M about 3 gives optimal results, but selecting values in the range from about 2 to about 7 is also possible. Once the windowing function is selected, the size M of the moving-average window may need to be adjusted for achieving optimal overall performance.

For the pixels that are close to the beginning or the end of the vector $v_i$, three techniques for computing the local square vector $v_i^{(ls)}$ are included in the exemplary implementations, although using other techniques is also possible:

i Computation Shortening

The sum in Equation (37) and the denominator in the coefficient in front of it are adjusted so that only elements of the vector $v_i$ are used in the computation. Thus, for the index k where $$k \leq \left\lfloor \frac{M}{2} \right\rfloor \text{ or } k \geq \left(N - \left\lfloor \frac{M-1}{2} \right\rfloor + 1\right),$$

the local square vector $v_i^{(ls)}$ is computed by:

$$v_i^{(ls)}(k) = \frac{1}{(j_{max} - j_{min} + 1)} \sum_{j=j_{min}}^{j_{max}} w_k(j) \cdot v_i^2(k+j) \quad (38)$$

where $$j_{min} = \max\left(-\left\lfloor \frac{M}{2} \right\rfloor, 1-k\right) \text{ and } j_{max} = \min\left(\left\lfloor \frac{M-1}{2} \right\rfloor, N-k\right).$$

In this case, the windowing function depends on the index k because the window is truncated and needs to be normalized such that the sum of its elements equals $(j_{max}-j_{min}+1)$. Therefore, for all values of j from $j_{min}$ to $j_{max}$ as defined by Equation (38):

$$w_k(j) = \frac{(j_{max} - j_{min} + 1) \cdot w(j)}{M}, \text{ where } D = \sum_{j=j_{min}}^{j_{max}} w(j) \quad (39)$$

and w is the chosen windowing function. The computation shortening may lead to slight degradation in the accuracy of the local square estimate for the pixels where it is applied to, but the distortion the computation shortening introduces is the smallest in comparison with the other methods.

i Replica Padding

Each vector $v_i$ is extended to include zero and negative indices and indices larger than N as specified in Equations (24) and (25). The added elements in this extension can also be copies of the first and last elements, respectively, of the vector $v_i$ in the same order as they appear in $v_i$. Then the local square $v_i^{(ls)}$ is computed using Equation (37).

iii Constant Padding

Each vector $v_i$ is extended to include zero and negative indices and indices larger than N as specified in Equations (26) and (27). Then the local square $v_i^{(ls)}$ is computed using Equation (37).

D.2.3.3.3 Computing the Local Variance Vector

For each pixel with index k, where k is from 1 to N, each element of the local variance vector $v_i^{(lv)}$ is computed by:

$$v_i^{(lv)}(k) = v_i^{(ls)}(k) - (v_i^{(lm)}(k))^2 \quad (40)$$

D.2.3.3.4 Computing the Scaling Coefficient Vector

For each pixel with index k, where k is from 1 to N, each element of the scaling coefficient vector $d_i$ is computed by:

$$d_i(k) = \left(\frac{\max(0, v_i^{(lv)}(k) - \sigma_w^2)}{\max(v_i^{(lv)}(k), \sigma_w^2)}\right)^{\beta_w} \quad (41)$$

where $\sigma_w^2$ is the Wiener variance and $\beta_w$ is the Wiener beta coefficient. Since in Equation (41), the numerator is always smaller than the denominator, by raising the ratio to power $\beta_w$, chosen to be greater than 1, the scaling coefficient $d_i(k)$ will be smaller than when $\beta_w$ is 1. Conversely, by raising the ratio to power $\beta_w$ chosen to be smaller than 1, the scaling coefficient $d_i(k)$ will be greater then when $\beta_w$ is 1. Thus, the Wiener filter beta coefficient $\beta_w$ controls the relative weight put on the scaling factor with respect to the difference between the local variance $v_i^{(lv)}(k)$ and the Wiener filter variance $\sigma_w^2$. A Wiener filter beta coefficient $\beta_w$ of 1 provides good overall performance along with simple implementation since no raising to power is computed in this case, but other values of $\beta_w$ can also be used, in particular $\beta_w=2$.

The Wiener filter variance $\sigma_w^2$ is a critically important parameter that determines the overall performance. Determining its value is related to the scanner pattern variance $\sigma_s^2$ (and to its derived parameter $\sigma_t^2$ in case of inverse signal mode) because the level of the filtering effect of the Wiener filter directly depends on the value of $\sigma_w^2$. However, using the value of $\sigma_s^2$ (or $\sigma_t^2$) or its estimate to derive a value for $\sigma_w^2$ in a simplistic way is not recommended because of three reasons: (1) the Wiener filter essentially "sees" as noise the combined effect of the scanner pattern and the scanner noise, (2) $\sigma_w^2$ is a tradeoff parameter that controls the relationship between the false accept rate and the false reject rate, and (3) other factors, such as varying environmental conditions, may lead to unwanted variations in the overall performance. Thus, the best value for $\sigma_w^2$ is typically the result of optimization and tests (with multiple scanners of the same type and under different environmental conditions). When such optimization is not available, as a very approximate guideline, in direct signal mode, $\sigma_w^2$ can be set to the sum of the estimates for the scanner pattern variance $\sigma_s^2$ and the scanner noise variance $\sigma_n^2$. For the direct signal mode implementation of the Preprocessing Module, $\sigma_w^2$ can be set to about 30 for Signal Model A and to about 8 for Signal Model B. For the inverse signal mode implementation of the Preprocessing Module, $\sigma_w^2$ can be set to about $3 \cdot 10^{-8}$ for Signal Model A and to about $4 \cdot 10^{-9}$ for Signal Model B.

By increasing $\sigma_w^2$, the output signal x of the Filtering Module will contain more pixels with scanner pattern, but the distortion from the fingerprint pattern in them will also be larger. By decreasing $\sigma_w^2$, the output signal x will contain fewer pixels but with more accurate estimate of the scanner pattern.

D.2.3.3.5 Computing the Smoothed Signal

For each pixel with index k, where k is from 1 to N, each element of the smoothed signal vector $v_i^{(s)}$ is computed by:

$$v_i^{(s)}(k) = v_s^{(lm)}(k) + d_i(k) \cdot (v_i(k) - v_i^{(lm)}(k)). \quad (42)$$

Once the smoothed signal vectors $v_i^{(s)}$, where i is an integer from 1 to c, are computed, they are concatenated one after each other to form the smoothed signal $v^{(s)}$:

$$v^{(s)} = \begin{bmatrix} v_1^{(s)} \\ v_2^{(s)} \\ \ldots \\ v_c^{(s)} \end{bmatrix}.$$

Finally, the output signal x of the Filtering Module in this implementation is the difference between the input signal v and the smoothed signal $v^{(s)}$, corrected with the Wiener mean $\mu_w$:

$$x(k) = v(k) - v^{(s)}(k) + \mu_w \quad (43)$$

where k is the current pixel index, an integer from 1 to (c·N). In the preferred implementation, the Wiener filter mean $\mu_w$ is set to 0, but other values of $\mu_w$ are also possible as $\mu_w$ can be used to compensate in case when fixed-valued offset is present so that the output signal v becomes zero mean. However, setting a non-zero value for $\mu_w$ may require adjustments in the thresholds of the various implementations of the Masking Module.

Figure 9:
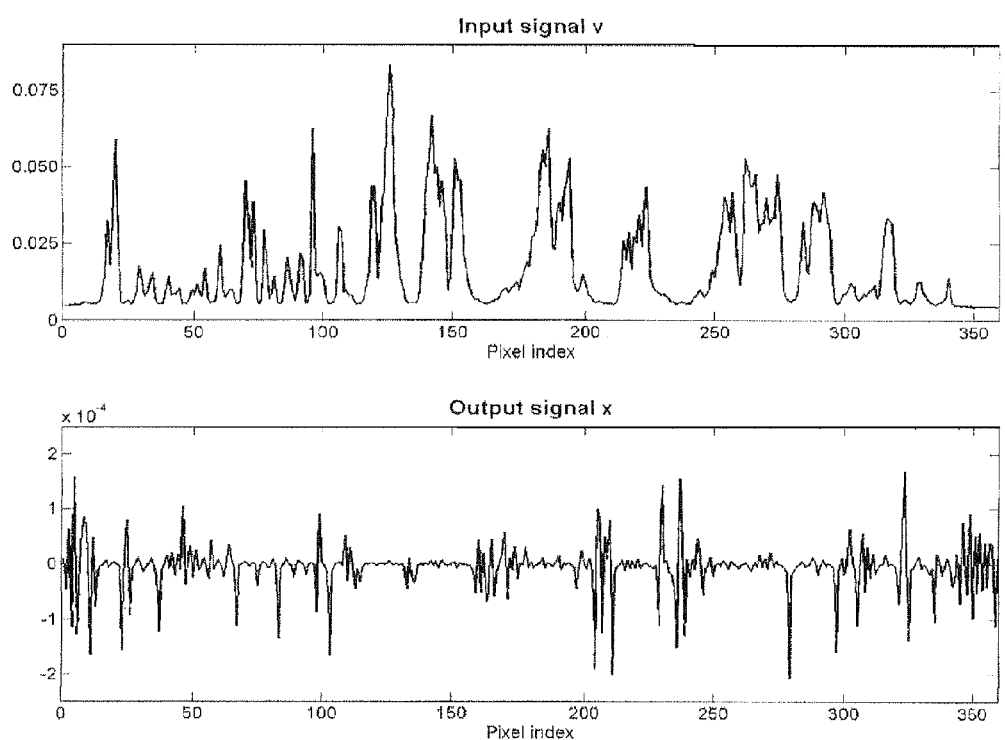
FIG. 9 shows the input signal and the output signal of an exemplary implementation of the Filtering Module.

FIG. 9 shows the input signal v and the output signal x of the Filtering Module for the adaptive Wiener filtering implementation for one column of pixels when the inverse signal mode is used.

D.2.4 Masking Module

The Masking Module is shown as block 408 in FIG. 8. It marks as usable those pixels from the input signal x that contain sufficiently accurate estimate of the scanner pattern and as unusable the remaining pixels, producing a binary mask as the output signal y.

When using the Low-pass Filter Implementation or the Adaptive Wiener Filter Implementation of the Filtering Module, the following observations regarding masking can be made for the four types of regions below:

i. In the regions of transitions between a valley and a ridge, the adjacent pixels have very different grayscale values, which makes the local mean signal $v^{(lm)}$ significantly different from the input signal v. Consequently, the output signal x is large and considerably different from the scanner pattern, which makes using the output signal x as a scanner pattern estimate difficult. Therefore, such regions are marked not to be used, i.e., with mask value 0.

ii. In the regions with ridges where either (a) the adjacent pixels have considerably different grayscale values (which is similar to case (i)), with this difference particularly pronounced when using the inverse signal model, or (b) the pixel values are saturated because of the particular fingerprint scanner implementation, thus all of these pixels have the same constant grayscale value, resulting in an output signal x being equal to 0, rendering it not useful as a scanner pattern estimate. Therefore, such regions are marked not to be used, i.e., with mask value 0.

iii. In the regions where the adjacent pixels have grayscale values approximately equal to each other, very often such pixels actually are significantly corrupted by the scanner noise, which makes using the output signal x as a scanner pattern estimate difficult. Therefore, such regions are marked as not to be used, i.e., with mask value 0.

iv. In the regions with valleys and in the regions without a fingerprint pattern being present (i.e., no fingertip skin touches the scanner platen), the difference between the input signal v and the local mean signal $v^{(lm)}$ provides an accurate estimate of the scanner pattern. Therefore, such regions are marked as useful, i.e., with mask value 1.

Therefore, the magnitude of the signal x, which is the difference between the signal v and its smoothed version, can be used to decide about the usefulness of the pixel in question for estimating the scanner pattern.

The Masking Module has several implementations which are described below.

D.2.4.1 Threshold Implementation

When using the Bypass Implementation of the Filtering Module, the Masking Module is implemented via a Threshold Implementation. In the direct signal mode of the Preprocessing Module, the pixel values in the regions with valleys are greater than the pixel values in the regions with ridges for both Signal Model A and Signal Model B (see Equation (13)). Therefore, by comparing the values of each pixel with a threshold, a decision can be made as to whether the pixel can be used to estimate the scanner pattern or not. Thus, in the direct signal mode, for each pixel index k from 1 to (c·N), the output signal y is computed by:

$$y(k) = \begin{cases} 1 & \text{if } u(k) \geq \theta \\ 0 & \text{otherwise} \end{cases} \quad (44)$$

Where $\theta$ is the threshold value. The comparison can be done also in the inverse signal mode of the Preprocessing Module, in which case the condition in Equation (44) is replaced by $u(k) \leq (1/\theta)$.

When an estimate $\bar{s}$ (for example, computed using Equation (5)) of the scanner pattern mean $\mu_s$ for a particular fingerprint scanner is available, then $\theta$ can be set fixed for all pixel indices k to about 90% of $\bar{s}$. When local estimates $\hat{\mu}_s(i, j)$ (for example, computed using Equation (8) or Equation (9))

of the scanner pattern mean $\mu_s$ are available, then $\theta$ can be set separately for each index k to about 90% of the local estimate $\hat{\mu}_s(i, j)$ that corresponds to the pixel in question. When in addition to estimates of the scanner pattern mean $\mu_s$ an estimate $\hat{\sigma}_s^2$ of the scanner pattern variance $\sigma_s^2$ is also available (for example, computed using Equation (6), (10), (11) or (12)), the threshold $\theta$ can be set to about $3\hat{\sigma}_s$ below the estimate ($\bar{s}$ or $\hat{\mu}_s(i, j)$, whichever is available) of the scanner pattern mean $\mu_s$.

When no estimate of the scanner pattern mean $\mu_s$ is available, the threshold $\theta$ can be computed using the following method. First, the unique values of the signal v are stored in a vector $U_v$ such that each element of the vector $U_v$ represents each unique value of the signal v and the elements of the vector $U_v$ are sorted in ascending order, with the first element of the vector $U_v$ being equal to the smallest value of the signal v and the last element of the vector $U_v$ being equal to the largest value of the signal v. This is possible because the signal v is either equal to the signal g, which is a discrete-valued signal (e.g., its range is the integers from 0 to 255 when g is an 8-bit grayscale image) or to its inverse, the signal h, which is also a discrete-valued signal when the signal g is discrete valued. Furthermore, when g is an 8-bit grayscale image, the vector $U_v$ has at most 256 elements in both cases.

Next, a new vector $D_v$, derived from the vector $U_v$, is computed by:

$$D_v(k)=U_v(k+1)-U_v(k) \quad (45)$$

where the index k runs such as to address all elements of the vector $U_v$. The vector $D_v$ contains differences between the values of adjacent elements of the vector $U_v$ and thus it carries information about "gaps" in the unique pixel values of the image g.

In exemplary implementations where the direct signal mode of the Preprocessing Module is used, the last Q elements of the vector $D_v$ are then inspected. A large-value element in these Q elements of the vector $D_v$, which element corresponds to a large difference between adjacent elements in the vector $U_v$, may mark the separation between the values of two groups of pixels of the image: (1) a group of pixels that correspond to abnormally operating sensing elements, such as dead and defective pixels which are unique for every fingerprint scanner, which group of pixels are henceforth referred to as outliers and (2) a group of pixels that correspond to valleys in the image. Thus, the largest value of these Q elements of the vector $D_v$ can be considered as an indicator about the split between these two groups of pixels. Let the index of this largest value element be R. Then, the average of the elements with indices from 1 to (R−1) is computed by:

$$\bar{d} = \frac{1}{(R-1)}\sum_{k=1}^{R-1} D_v(k). \quad (46)$$

If the value of the element $D_v(R)$ is over about 4 times greater than this average $\bar{d}$, i.e., $D_v(R)>4\bar{d}$, then the value of the element $U_v(R)$ indicates the peak value from which the threshold $\theta$ can be computed by:

$$\theta=U_v(R)-\Delta \quad (47)$$

where $\Delta$ is a suitably chosen constant, which is about 32 for Signal Model A and about 18 for Signal Model B, both when the direct signal mode of the Preprocessing Module is utilized. When an estimate $\hat{\sigma}_s^2$ of the scanner pattern variance $\sigma_s^2$ is available, then the constant $\Delta$ can be set to about 6 times the estimate $\hat{\sigma}_s$. This factor 6 can be motivated by the observation that the scanner pattern s has a Gaussian distribution and thus selected threshold $\theta$ can be thought to be about $3\sigma_s$ below the scanner pattern mean $\mu_s$ (which is unknown) and the peak value $U_v(R)$ to be about $3\sigma_s$ above the scanner pattern mean $\mu_s$. Thus, all pixels that are about $\pm 3\sigma_s$ around the (unknown) scanner pattern mean $\mu_s$ are being marked as useful.

In exemplary implementations where the inverse signal mode of the Preprocessing Module is used, the processing is analogous. Since the inversion (see Equation (14)) transforms large numbers into small ones and small numbers into large ones, several adjustments have to be made: (i) the first Q elements of the vector $D_v$ are inspected, no the last ones, (ii) a small-value element in these Q elements of the vector $D_v$ corresponds to a large difference between pixels in the image, therefore the smallest value of these Q elements can be considered as an indicator about the split point, (iii) the inequality condition has the opposite direction, and (iv) the constant $\Delta$ can be set to about 6 times the value of $\sigma_t$, which $\sigma_t$ is derived from the estimate $\hat{\sigma}_s^2$ of the scanner pattern variance.

In an alternative implementation where no estimates of the scanner pattern characteristics (mean $\mu_s$ and standard deviation $\sigma_s$ are available), the threshold $\theta$ can be set to about 185 for Signal Model A and to about 210 for Signal Model B and used in Equation (44). When the inverse signal mode of the Preprocessing Module is utilized, the condition in Equation (44) is replaced by $u(k) \leq (1/\theta)$ and the same values for the threshold $\theta$ are used.

The Threshold Implementation is simple to implement, but its performance under changing environmental conditions, such as temperature and moisture, may be suboptimal.

D.2.4.2 Magnitude Masking Implementation for Low-Pass Filter

In this implementation, by comparing the magnitude (i.e., the absolute value) of the elements of the input signal x with two thresholds, a decision can be made as to whether the pixel can be used to estimate the scanner pattern or not. Thus, in the direct signal mode of the Preprocessing Module, for each pixel index k from 1 to (c·N), the output signal y is computed by:

$$y(k) = \begin{cases} 1 & \text{if } \varphi_{min} \leq |x(k)| \leq \varphi_{max} \\ 0 & \text{otherwise} \end{cases} \quad (48)$$

where $\phi_{min}$ and $\phi_{max}$ are the two threshold values.

In the direct signal mode of the Preprocessing Module, $\phi_{min}$ can be set to about half of the scanner noise standard deviation $\sigma_n$ and $\phi_{max}$ to about the square root of the sum of the scanner pattern variance $\sigma_s^2$ and the scanner noise variance $\sigma_n^2$. Thus, $\phi_{min}$ can be set to about 0.67 for Signal Model A and to about 0.5 for Signal Model B. When an estimate $\hat{\sigma}_s$ of the scanner pattern standard deviation $\sigma_s$ is available (for example, computed using Equation (6), (10), (11) or (12)), $\phi_{max}$ can be set to about $\sqrt{\hat{\sigma}_s^2+1.8}$ for Signal Model A and to about $\sqrt{\hat{\sigma}_s^2+1}$ for Signal Model B. When no estimate of the scanner pattern standard deviation is available, $\phi_{max}$ can be set to about 5.5 for Signal Model A and to about 3.6 for Signal Model B.

In the inverse signal mode of the Preprocessing Module, $\phi_{min}$ can be set to about $$\frac{\sigma_n}{2\mu_s^2}$$

and $\phi_{max}$ to about $$\sqrt{\frac{\sigma_s^2 + \sigma_n^2}{\mu_s^4}}.$$

Thus, when an estimate $\bar{s}$ of the scanner pattern mean $\mu_s$ for a particular fingerprint scanner is available, $\phi_{min}$ can be set to about $$\frac{0.67}{\bar{s}^2}$$

for Signal Model A and to about $$\frac{0.5}{\bar{s}^2}$$

for Signal Model B. When no estimate of the scanner pattern mean $\mu_s$ is available, $\phi_{min}$ can be set to about $1.8 \cdot 10^{-5}$ for Signal Model A and to about $0.95 \cdot 10^{-5}$ for Signal Model B. When an estimate $\hat{\sigma}_s^2$ of the scanner pattern variance $\sigma_s^2$ is available (for example, computed using Equation (6), (10), (11) or (12)), $\phi_{max}$ can be set to about $$\sqrt{\frac{\hat{\sigma}_s^2 + 1.8}{\bar{s}^4}}$$

for Signal Model A and to about $$\sqrt{\frac{\hat{\sigma}_s^2 + 1}{\bar{s}^4}}$$

for Signal Model B. When no estimate of the scanner pattern variance $\sigma_s^2$ is available, $\phi_{max}$ can be set to about $1.36 \cdot 10^{-4}$ for Signal Model A and to about $0.68 \cdot 10^{-4}$ for Signal Model B.

D.2.4.3 Variance Masking Implementation for Low-Pass Filter

In this implementation, by comparing an estimate of the local variance of the input signal x with two thresholds, a decision can be made as to whether the pixel can be used to estimate the scanner pattern or not. Thus, in the direct signal mode of the Preprocessing Module, for each pixel index k from 1 to (c·N), the output signal y is computed by:

$$y(k) = \begin{cases} 1 & \text{if } \gamma_{min} \leq |v^{(lv)}(k)| \leq \gamma_{max} \\ 0 & \text{otherwise} \end{cases} \quad (49)$$

where $\gamma_{min}$ and $\gamma_{max}$ are the two threshold values. The signal $v^{(lv)}$ is the local variance computed by concatenating the local variance vectors $v_i^{(lv)}$, where the index i is from 1 to c:

$$v^{(lv)} = \begin{bmatrix} v_1^{(lv)} \\ v_2^{(lv)} \\ \ldots \\ v_c^{(lv)} \end{bmatrix}. \quad (50)$$

Each vector $v_i^{(lv)}$ in Equation (50) is computed using Equation (40), where M, the positive integer that determines the size of the moving-average window, is chosen to be about 5 for computing the local mean vectors $v_i^{(lm)}$ and the local square vectors $v_i^{(ls)}$ as specified in the Adaptive Wiener Filter implementation of the Filtering Module.

In the direct signal mode of the Preprocessing Module, $\gamma_{max}$ can be set to approximately the sum of the scanner pattern variance $\sigma_s^2$ and the scanner noise variance $\sigma_n^2$, and $\gamma_{min}$ can be set to about 50% of $\gamma_{max}$. When an estimate $\hat{\sigma}_s^2$ of the scanner pattern variance $\sigma_s^2$ is available (for example, computed using Equation (6), (10), (11) or (12)), $\gamma_{max}$ can be set to about $(\hat{\sigma}_s^2 + 1.8)$ for Signal Model A and to about $(\hat{\sigma}_s^2 + 1)$ for Signal Model B. When no estimate of the scanner pattern standard deviation is available, $\gamma_{max}$ can be set to about 30 for Signal Model A and to about 14 for Signal Model B.

In the inverse signal mode of the Preprocessing Module, $\gamma_{max}$ can be set to about $$\frac{\sigma_s^2 + \sigma_n^2}{\mu_s^4},$$

and $\gamma_{min}$ can be set to about 50% of $\gamma_{max}$. Thus, when an estimate $\bar{s}$ of the scanner pattern mean $\mu_s$ for a particular fingerprint scanner and an estimate $\hat{\sigma}_s^2$ of the scanner pattern variance $\sigma_s^2$ are available (for example, computed using Equation (6), (10), (11) or (12)), $\gamma_{max}$ can be set to about $$\frac{\hat{\sigma}_s^2 + 1.8}{\bar{s}^4}$$

for Signal Model A and to about $$\frac{\hat{\sigma}_s^2 + 1}{\bar{s}^4}$$

for Signal Model B. When no estimates of the scanner pattern mean $\mu_s$ or standard deviation $\sigma_s$ are available, $\gamma_{max}$ can be set to about $1.87 \cdot 10^{-8}$ for Signal Model A and to about $0.46 \cdot 10^{-8}$ for Signal Model B.

D.2.4.4 Magnitude Masking Implementation for Adaptive Wiener Filter

In regions where the signal v changes very little, such as in valleys or in areas of the scanner platen where no fingertip is applied to, the adaptive Wiener filter suppresses these small changes (because the "signal-to-noise" ratio is small and the Wiener filter treats the signal as containing predominantly "noise"). Thus, the output of the filter, the signal x, which is the difference between the signal v and its smoothed version, gives an accurate estimate of the scanner pattern. Therefore, the magnitude of the signal x can be used as a criterion for the usefulness of the pixel in question: if this magnitude is sufficiently large, the corresponding pixel is marked as useful. On the other hand, in regions where the signal v undergoes significant changes, such as in transitions between a valley and a ridge, the adaptive Wiener filter leaves the signal v almost unaltered (because the "signal-to-noise" ratio is large and the Wiener filter does not suppress the "noise"). Thus, the magnitude of the difference between the signal v and its smoothed version is close to 0, and therefore using the signal x may lead to inaccurate estimate of the scanner pattern. For this reason, these regions are marked not to be used. In summary, for each pixel with index k from 1 to (c·N), the output signal y is constructed by:

$$y(k) = \begin{cases} 1 & \text{if } |x(k)| \geq \alpha_w \cdot \sigma_w \\ 0 & \text{otherwise} \end{cases} \quad (51)$$

where $\sigma_w$ is the square root of the Wiener variance as specified in the Adaptive Wiener Filter Implementation, and $\alpha_w$ is a suitably chosen scaling coefficient. For Signal Model A, $\alpha_w$ can be chosen to be about 0.50 in the direct signal mode and about 0.33 in the inverse signal mode. For Signal Model B, $\alpha_w$ can be chosen to be about 0.50 in either signal mode, direct or inverse.

$\alpha_w$ is a tradeoff parameter that controls the level of scanner noise present in the pixels marked as useful. By increasing $\alpha_w$, more pixels (with small magnitudes) are marked as non-useful because in them the scanner noise is comparable with the scanner pattern and thus it is better to not use them; this leaves for matching fewer pixels but they contain stronger scanner pattern. On the other hand, by decreasing $\alpha_w$, more pixels with scanner noise comparable with the scanner pattern are used for matching. We recommend establishing the optimal $\alpha_w$ as result of optimization and tests; when such are infeasible, we recommend $\alpha_w$ to be chosen to about 0.50 in both direct and inverse modes for both Signal Model A and Signal Model B.

D.2.4.5 Valley Masking Implementation for Adaptive Wiener Filter

The objective of this mode of masking is determining the pixel indices of the regions with valleys in the signal v. First, for each vector $v_i$ of the signal v, where i is an integer from 1 to c, the gradient vector $v_i^{(g)}$ is computed by:

$$v_i^{(g)}(k) = \frac{v_i(k+1) - v_i(k-1)}{2} \quad (52)$$

where k is an integer from 2 to (N-1). The first and the last elements of the gradient vector $v_i^{(g)}$ are computed by:

$v_i^{(g)}(1) = v_i(2) - v_i(1)$ $v_i^{(g)}(N) = v_i(N) - v_i(N-1)$ (53)

Let $F_i$ be the set of all elements in $v_i$ for which $|v_i^{(g)}(k)|$ is less than about 2 times the value of $\hat{\sigma}_s$ in direct signal mode or about 2 times the value of $\hat{\sigma}_t$ in inverse signal mode. Let $\mu_F$ be the mean value of the elements in $F_i$, $m_{LF}$ be the mode of the histogram of those elements in $F_i$ that are smaller than $\mu_F$, and $m_{RF}$ be the mode of the histogram of those elements in $F_i$ that are greater than or equal to $\mu_F$. If the difference ($m_{RF} - m_{LF}$) is smaller than about 2 times the value of $\hat{\sigma}_s$ in direct signal mode or about 2 times the value of $\hat{\sigma}_t$ in inverse signal mode, all elements in $v_i$ can be used, i.e., y(k)=1 for all k. Otherwise, y(k) is set to 1 only for those k for which $v_i(k)$ is greater than ($m_{RF} - \lambda$), where $\lambda$ is a predetermined value, which can be chosen to be about equal to $\hat{\sigma}_s$ in direct signal mode or to $\hat{\sigma}_t$ in inverse signal mode. This algorithm is repeatedly applied to all vectors $v_i$.

D.2.4.6 Threshold Masking Implementation for Adaptive Wiener Filter

When using the Adaptive Wiener Filter Implementation of the Filtering Module, the Threshold Implementation of the Masking Module can be used in the same way as when using the Bypass Implementation of the Filtering Module.

In all implementations of the Masking Module, its output y is a binary mask with the useful pixels of the signal x—those pixels that contain a sufficiently accurate estimate of the scanner pattern. Therefore, the signal x, possibly along with the signal y, can be used as an identifier of the scanner that acquired the image g. The signal x, possibly along with the signal y, can be stored as one or more sequences of numbers that represent the scanner, acquired the image, and later used in, for example, cryptographic or other applications. In case when several images g, acquired by one and the same scanner, are processed, the values of the corresponding signals x will be averaged and the values of the corresponding the signals y combined as disclosed herein to yield an average scanner pattern and its mask, which can then be stored as one or more sequences of numbers that represent the scanner that acquired these images g.

D.2.5 Matching Module

The Matching Module is shown as block 410 in FIG. 8. Let $x_e$ denote the output signal of the Filtering Module and $y_e$ denote the output signal of the Masking Module when the input signal g is an image acquired during the scanner enrolment. Let $x_q$ denote the output signal of the Filtering Module and $y_q$ denote the output signal of the Masking Module when the input signal g is an image acquired during the scanner verification. Using the signals $x_e$, $y_e$, $x_q$, and $y_q$, the Matching Module: (i) selects the common pixel indices marked as useful in the signals $y_e$ and $y_q$, (ii) quantifies the similarity between the two signals $x_e$ and $x_q$ for these common pixel indices in a score, and (iii) produces a decision via the output signal d as to whether the two images have been acquired with the same fingerprint scanner by comparing this score with a threshold. When the output signal d takes the value 1, this indicates scanner match; when it takes value 0, this indicates scanner non-match; and when it takes value (-1), this indicates that a decision on matching/non-matching cannot be made and a new query image must be acquired. If multiple images are acquired during the scanner enrolment, the Matching Module performs (i) and (ii) for each pair of one enrolled image and the query image, and computes the average of all scores, which average is used to perform (iii).

The selection of the common pixel indices marked as useful in the signals $y_e$ and $y_q$ produces the signal $y_m$ so that:

$$y_m(k) = \begin{cases} 1 & \text{if } y_e(k) = 1 \text{ and } y_q(k) = 1 \\ 0 & \text{otherwise} \end{cases} \quad (54)$$

where the index k is an integer running from 1 to (c·N). Let D be the set of all indices k for which $y_m(k)=1$, and let $N_D$ be the number of elements in this set D.

If $N_D$ is less than about 100, the Matching Module produces (-1) as the output signal d, which indicates that the number of common pixel indices is insufficient to compute a reliable similarity score and to make a decision thereof. In this case, acquiring a new query image is necessary.

Quantifying the similarity between the two signals $x_e$ and $x_q$ for the common pixel indices as computed in the signal $y_m$ in a score can be done with the following three implementations.

D.2.5.1 Normalized Correlation Implementation

First, the norms of the signals $x_e$ and $x_q$ for the indices in the set D are computed by:

$$\|x_e\| = \sqrt{\sum_{k \in D} |x_e(k)|^2} \quad (55)$$

$$\|x_q\| = \sqrt{\sum_{k \in D} |x_q(k)|^2} \quad (56)$$

If any of the norms $\|x_e\|$ or $\|x_q\|$ equal to zero, the Matching Module produces 0 as an output signal d and does not perform further computations. Otherwise, the similarity score $z^{(nc)}$ is computed by:

$$z^{(nc)} = \frac{\sum_{k \in D} x_e(k) x_q(k)}{\|x_e\| \cdot \|x_q\|}. \tag{57}$$

The output signal d is then computed by comparing the similarity score $z^{(nc)}$ with a predetermined threshold:

$$d = \begin{cases} 1 & \text{if } z^{(nc)} \geq \tau^{(nc)} \\ 0 & \text{otherwise} \end{cases} \tag{58}$$

The decision threshold $\tau^{(nc)}$ is the result of optimization and lies in the range from about 0.4 to about 0.6.

D.2.5.2 Correlation Coefficient Implementation

First, the zero-mean signals $\tilde{x}_e$ and $\tilde{x}_q$ for the indices k in the set D are computed by:

$$\tilde{x}_e(k) = x_e(k) - \frac{1}{N_D} \sum_{k \in D} x_e(k) \tag{59}$$

$$\tilde{x}_q(k) = x_q(k) - \frac{1}{N_D} \sum_{k \in D} x_q(k) \tag{60}$$

where the index k runs through all elements in the set D. The values of $\tilde{x}_e(k)$ and $\tilde{x}_q(k)$ for indices k that do not belong to the set D can be set to 0 or any other number because they will not be used in the computations that follow.

Next, the norms of the signals $\tilde{x}_e$ and $\tilde{x}_q$ for the indices k in the set D are computed by:

$$\|\tilde{x}_e\| = \sqrt{\sum_{k \in D} |\tilde{x}_e(k)|^2} \tag{61}$$

$$\|\tilde{x}_q\| = \sqrt{\sum_{k \in D} |\tilde{x}_q(k)|^2}. \tag{62}$$

If any of the norms $\|\tilde{x}_e\|$ or $\|\tilde{x}_q\|$ are equal to zero, the Matching Module produces 0 as an output signal d and does not perform further computations. Otherwise, the similarity score $z^{(cc)}$ is computed by:

$$z^{(cc)} = \frac{\sum_{k \in D} \tilde{x}_e(k) \tilde{x}_q(k)}{\|\tilde{x}_e\| \cdot \|\tilde{x}_q\|} \tag{63}$$

The output signal d is then computed by comparing the similarity score $z^{(cc)}$ with a predetermined threshold:

$$d = \begin{cases} 1 & \text{if } z^{(cc)} \geq \tau^{(cc)} \\ 0 & \text{otherwise} \end{cases} \tag{64}$$

The decision threshold $\sigma^{(cc)}$ is the result of optimization and lies in the range from about 0.4 to about 0.6.

The preferred implementation uses the Correlation Coefficient Implementation.

Figure 10:
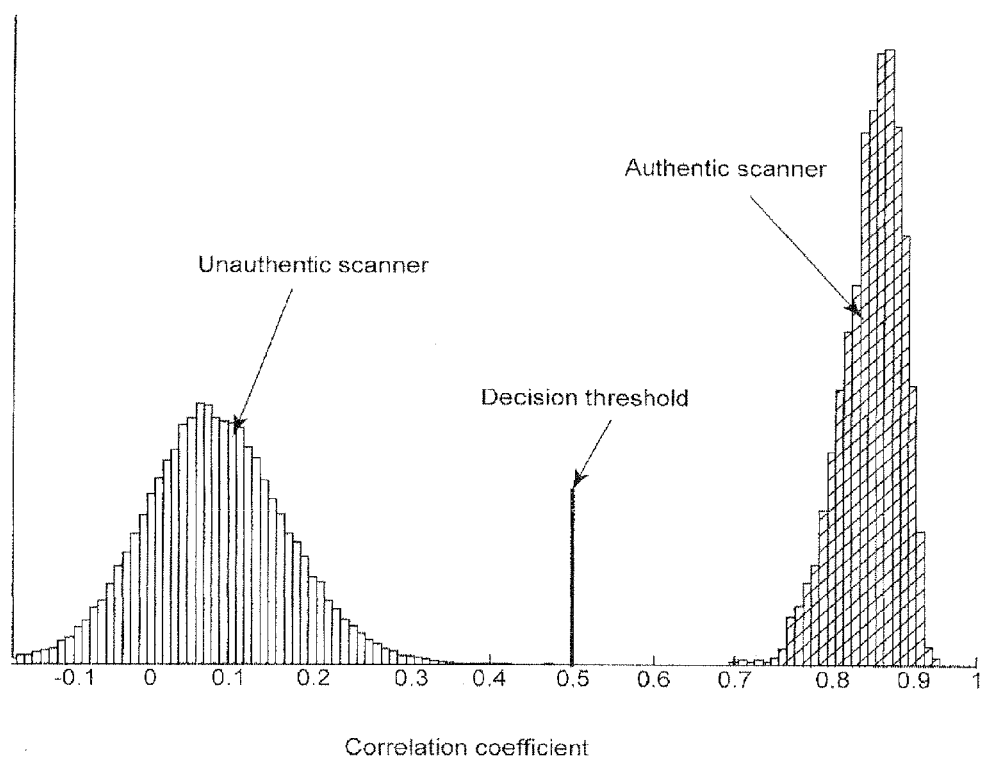
FIG. 10 shows the scanner authentication decisions in one exemplary implementation which employs the correlation coefficients as a similarity score.

FIG. 10 shows the scanner authentication decisions in one exemplary implementation, which employs correlation coefficient as a similarity score, for two cases: (a) when the query scanner is the authentic scanner and (b) when the query scanner is another, unauthentic scanner. An exemplary decision threshold with value 0.5 is also shown in the same figure.

D.2.5.3 Relative Mean Square Error Implementation

First, the norm of the signal $x_e$ for the indices in the set D is computed as specified by:

$$\|x_e\| = \sqrt{\sum_{k \in D} |x_e(k)|^2}. \tag{65}$$

If the norm $\|x_e\|$ is equal to zero, the Matching Module produces 0 as an output signal d and does not perform further computations. Otherwise, the similarity score $z^{(rmse)}$ is computed by:

$$z^{(rmse)} = \frac{\sqrt{\sum_{k \in D} [x_e(k) - x_q(k)]^2}}{\|x_e\|}. \tag{66}$$

The output signal d is then computed by comparing the similarity score $z^{(rmse)}$ with a predetermined threshold:

$$d = \begin{cases} 1 & \text{if } z^{(rmse)} \leq \tau^{(rmse)} \\ 0 & \text{otherwise} \end{cases} \tag{67}$$

The decision threshold $z^{(rmse)}$ is the result of optimization and lies in the range from about 0.8 to about 1.1.

D.2.6 Using Multiple Images

All exemplary implementations described herein are capable of using a single image for the scanner enrolment and a single image for the scanner authentication, and this is preferred because (a) it requires the least amount of computations and (b) it is the most secure as it determines if two images are taken with the same scanner or not without any additional images. However, variations are also possible. For example, it is typical for the biometric systems to capture three images and use them for enrolling the biometric information. Similarly, another exemplary implementation allows using multiple images for the scanner enrolment and/or multiple images for the scanner verification. This may improve the overall accuracy of the scanner authentication.

The methods for processing multiple images are as previously disclosed. Herein we disclose several exemplary illustrative implementations.

Let the number of enrolled images be E and the output signals of the Filtering Module and the Masking Module, when the enrolled image with index r is being processed, be $x_r$ and $y_r$, respectively. In the preferred exemplary implementation, the similarity scores for each pair consisting of one enrolled image and the query image are averaged and the resulting average similarity score is used to produce a decision. Thus, if the similarity score between the query image and the enrolled image with index r is denoted by $z_r$, which is computed using Equation (57), (63), or (66), then the average similarity score $z_a$ is:

$$z_a = \frac{1}{E} \sum_{r=1}^{E} z_r. \tag{68}$$

Finally, the output signal d of the Matching Module is computed using Equation (58), (64), or (67), depending on which implementation of the Matching Module is used for computing the similarity scores $z_r$.

Another implementation computes an "average" enrolled scanner pattern from All enrolled images and uses this "average" enrolled scanner pattern in the Matching Module. First, the "average" mask $y_a$ is computed by:

$$y_a(k) = \prod_{r=1}^{E} y_r(k) \tag{69}$$

where k is an integer running from 1 to (c·N). Then the "average" scanner pattern is computed by:

$$x_a(k) = \frac{1}{N_a} \sum_{r=1}^{E} y_a(k) x_r(k) \tag{70}$$

where $N_a$ is the number of elements in $y_a$ for which $y_a(k)=1$. Next, $x_a$ is used instead of the signal $x_w$ and $y_a$ is used instead of the signal $y_e$ in the Matching Module. The performance of this implementation can be suboptimal in certain cases because of two reasons: (1) since the signals $y_r$ for different indices r (and thus different enrolled images) may be considerably different from one another, the "average" mask $y_a$, which essentially is a logical AND of all $y_r$, may have very few non-zero elements, which may result in fewer than sufficient number of pixels to be used in the Matching Module, and (2) the "average" signal $x_a$ may become considerably distorted for some pixels and this may result in false scanner match or false scanner non-match decisions.

D.3 Implementations and Performance

All implementations of the {Selection Module, Filtering Module, Matching Module} can be used in combination with any of the implementations of the modules that precede this current module in the conceptual signal flow diagram depicted in FIG. 8. However, different combinations of module implementations may provide different overall performance.

The implementations of the signal processing modules that can be used in combination are suggested in the description of each module or its implementations, but the scope of the present disclosure is not limited to those suggested combinations of implementations. However, different combinations of module implementations may provide different overall performance. Two well-performing exemplary illustrative non-limiting combinations of module implementations are shown in FIG. 11 and FIG. 12.

Figure 11:
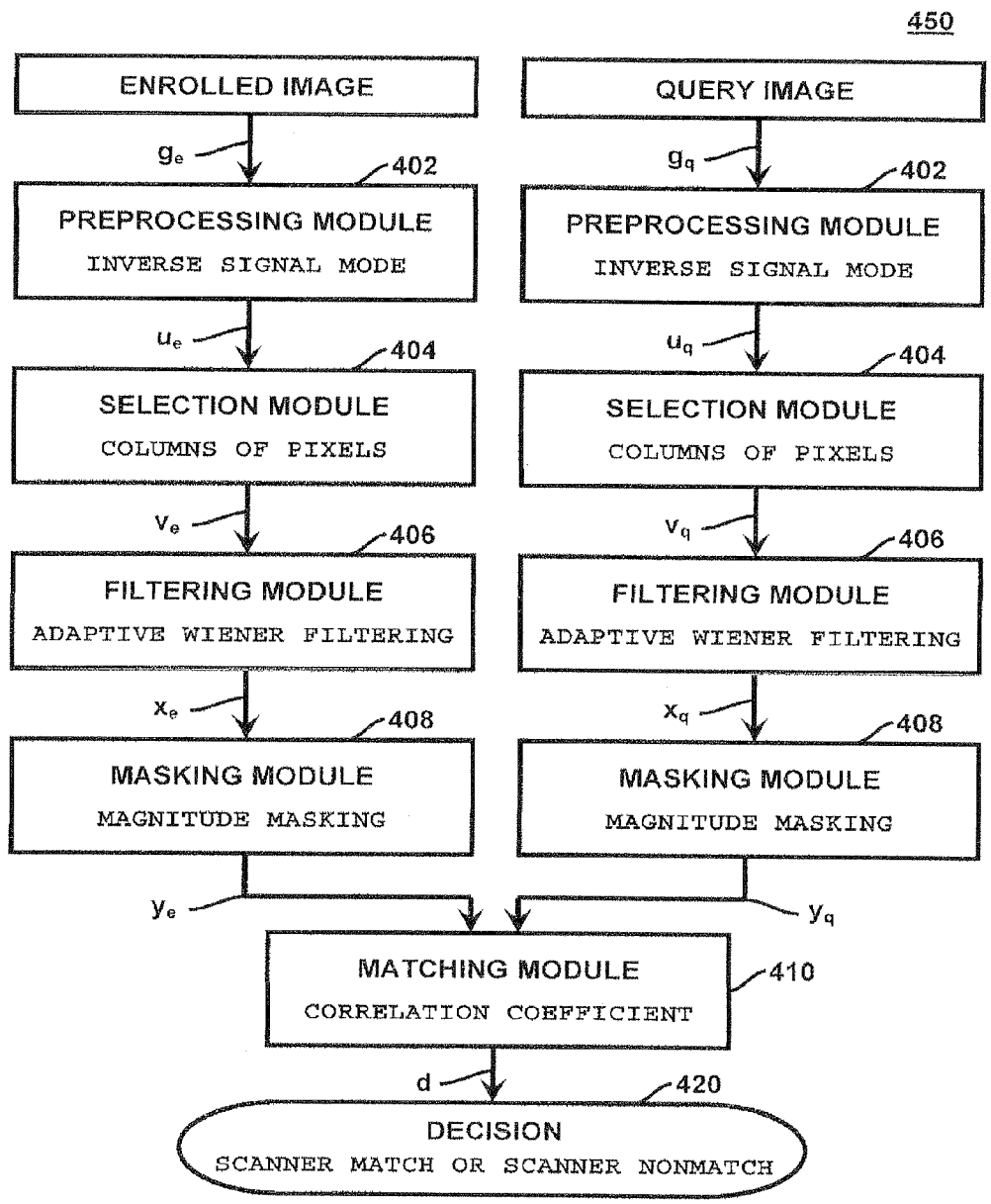
FIG. 11 is a flow diagram of the signal processing steps of one exemplary implementation.

FIG. 11 shows the flowchart 450 of the signal processing of one exemplary implementation of the present disclosure using a single enrolled image $g_e$, acquired and processed during the scanner enrolment, and a single query image $g_q$, acquired and processed during the scanner verification. Although $g_e$ and $g_q$ are processed at different times, the consecutive processing steps are identical, and therefore herein they are discussed simultaneously. $g_e$ and $g_q$ are first processed by the Preprocessing Module 402 operating in its inverse signal mode. The output signals $u_e$ and $u_q$ are processed by the Selection Module 404 selecting columns of pixels. The resulting signals $v_e$ and $v_q$ are processed by the Filtering Module 406 with an adaptive Wiener filter. The Masking Module 408 performs magnitude masking and yields the signals $y_e$ and $y_q$. Finally, the Matching Module computes the correlation coefficient and produces the signal d, based on which a decision for scanner match or scanner nonmatch is made.

Figure 12:
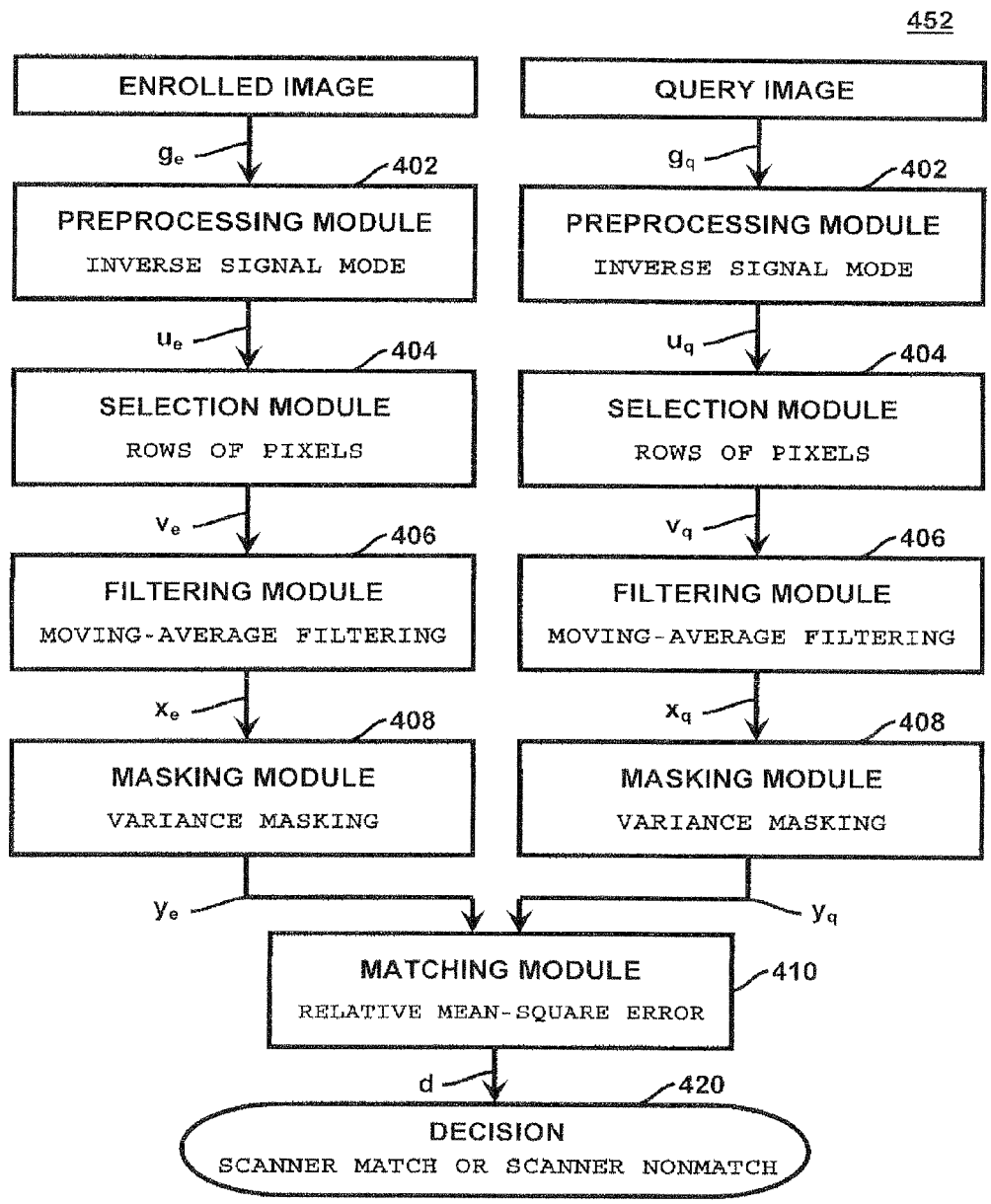
FIG. 12 is a flow diagram of the signal processing steps of another exemplary implementation.

FIG. 12 shows the flowchart 452 of the signal processing of another exemplary implementation of the present disclosure using a single enrolled image $g_e$, acquired and processed during the scanner enrolment, and a single query image $g_q$, acquired and processed during the scanner verification. Although $g_e$ and $g_q$ are processed at different times, the consecutive processing steps are identical, and therefore herein they are discussed simultaneously. $g_e$ and $g_q$ are first processed by the Preprocessing Module 402 operating in its inverse signal mode. The output signals $u_e$ and $u_q$ are processed by the Selection Module 404 selecting rows of pixels. The resulting signals $y_e$ and $v_q$ are processed by the Filtering Module 406 with a moving-average filter. The Masking Module 408 performs variance masking and yields the signals $y_e$ and $y_q$. Finally, the Matching Module computes the relative mean-square error and produces the signal d, based on which a decision for scanner match or scanner nonmatch is made.

For example, in the Filtering Module, computing a conventional convolution for the local means (and local squares) is unnecessary as the moving-average filter as well as the adaptive Wiener filter simply scale the adjacent pixels in a window by 1/M. In case of a fixed-point implementation, this can be further speed-optimized by choosing M to be a power of 2 so that the division is reduced to "shift right" as a microprocessor instruction or a hardware operation.

The specified signal processing modules can be implemented in the exemplary system 130 shown in FIG. 5 entirely by software programming of the processor 202, entirely in hardware, or some modules by software programming of the processor 202 and some modules in hardware. For example, the Selection Module and the Masking Module can be implemented in the digital hardware 208, while the Preprocessing Module, the Filtering Module, and the Matching Module can be implemented in software that runs on one or more processors 202.

The methods and systems disclosed herein work even for fingerprint scanners of exactly the same acquisition technology, manufacturer, and model. Furthermore, they require only a single image for the scanner enrolment and a single image for the scanner verification, although more images can be used for the scanner enrollment, for the scanner authentication, or for both.

Since each signal processing module has different modes of operation, this provides tools to optimize the performance and implementation granularity with varying degrees of complexity depending on the computational and time constraints of the target platform in a trade-off with the desired overall performance. Furthermore, the accuracy of the scanner authentication increases gradually as larger part of the images is used, thus allowing performance improvement by increasing the available computational power or time. For scanners of Signal Model A, good performance can be achieved by using as few as 10 (out of 256) columns of pixels (each with 360 rows), which is only 4% of all 92,160 image pixels.

FIG. 10 shows an illustrative performance of the exemplary implementation shown in FIG. 11 in which the Filtering Module uses Adaptive Wiener Filter Implementation with M=3, variance $\sigma_w^2=2\cdot10^{-8}$, and $\beta_w=1$, and the Masking Module uses Magnitude Masking Implementation with scaling coefficient $\alpha_w=0.45$. We tested this exemplary implementation on 4,400 images acquired (at room temperature) by 22 capacitive area scanners (TCEFC1 modules which use TCS1 area sensors, i.e., following Signal Model A) of UPEK (now DigitalPersona, Inc.) for 10 images per finger for all 10 fingers of 2 individuals. Only a single image $g_e$ is used for the scanner enrolment and only a single image $g_q$ is used for the scanner verification. Every image is matched against all other images, and the total number of matchings is about 10 million. Only one of the matchings, AB or BA, is computed since all processing is completely symmetric for $g_e$ and $g_q$. The normalized histograms (integrating to 1) of the correlation coefficients when using only 128 columns (a half of each image) are shown in FIG. 10. The two histograms (when the query image has been acquired with the authentic scanner and when the query image has been acquired with an unauthentic scanner) are very clearly separated, with their means about 0.84 far apart. With an exemplary decision threshold of 0.40 (also shown in FIG. 10), no decision errors were registered, i.e., the empirical False Accept Rate and False Reject Rate are both 0. There were no failures to enroll or verify a scanner, i.e., the number of pixels used for scanner pattern enrolment and matching were always sufficiently many. We also tested this exemplary implementation on images acquired at 3 temperatures and added to the set of images above; the added images were acquired at room temperature, at about 5° C., and at about 40° C. and were 10 images per finger for 3 fingers (right thumb, right index, and right little finger) of one individual using all 22 scanners.

The performance (as accuracy) of this exemplary implementation is not the upper bound that the methods and systems disclosed herein can deliver; rather, it is just an example for their potential. The modules and their modes should be considered as a set of tools, and the combinations of them to be implemented in a particular application and platform should be chosen and their parameters optimized once the target requirements and constraints are specified.

D.4 Applications and Advantages of the Exemplary Implementations

The herein described exemplary implementations provide methods and apparatuses for bipartite authentication which comprises biometric authentication (of a user) and biometric scanner authentication. The scanner authentication uses methods for computing a verification decision about the biometric scanner used to obtain the user biometric data, based on the extracted biometric scanner pattern or features.

The fingerprint scanner 110 that is legitimately constructively connected to system 130 in FIGS. 2-4, and that is used for the biometric enrolment of the legitimate user for the purpose of biometric authentication is hereinafter referred to as an authentic fingerprint scanner. Any other fingerprint scanner is hereinafter referred to as unauthentic fingerprint scanner. A digital image acquisition of a fingertip that is performed with the authentic fingerprint scanner is hereinafter referred to as authentic fingerprint image acquisition. Any other digital image acquisition of the same fingertip that is performed with an unauthentic fingerprint scanner is hereinafter referred to as unauthentic fingerprint image acquisition.

D.4.1 Estimating or Extracting Biometric Scanner Pattern or Features

One exemplary implementation is directed to a method and a system for estimating the scanner pattern from one more images and storing it (as one or more sequences of numbers) for future use. The scanner pattern can then be used as an identifier of the scanner, e.g., in cryptographic or other security applications.

One exemplary implementation is directed to a method for estimating the scanner pattern and extracting and encoding scanner features from it. Estimating the scanner pattern includes: (1) applying once or multiple times an object to the sensor of the fingerprint scanner; (2) acquiring at least one digital image, the acquiring step is hereinafter referred to as image acquisition; (3) selecting pixels from the at least one digital image, the pixels are hereinafter referred to as regions of interest, and said selecting step is hereinafter referred to as regions-of-interest selection, the regions-of-interest selection includes finding the regions of interest within the at least one digital image regardless of the location and the size of the fingerprint pattern contained in the at least one digital image; (4) processing the pixel values of the regions of interest using digital signal processing to extract and subsequently encode a sequence of numbers containing sufficient information to represent the fingerprint scanner, the sequence of numbers is hereinafter referred to as scanner pattern, and the processing step is hereinafter referred to as scanner pattern estimation; and (5) processing the scanner pattern using digital signal processing to extract and subsequently encode a sequence of numbers containing sufficient information to represent the scanner pattern, the sequence of numbers is hereinafter referred to as scanner features, and the processing is hereinafter referred to as scanner feature extraction.

In one exemplary implementation of the scanner pattern estimation method, the scanner pattern is estimated from a digital image or digital images acquired with a predetermined object applied to the fingerprint scanner. The predetermined object is chosen such that the digital image acquired with an ideal (perfect) fingerprint scanner when this predetermined object is applied to the scanner would give a digital image with uniform (i.e., constant) values for all pixels in the image. In this particular implementation, the regions of interest can contain all pixels of the digital image or images. The preferred predetermined object depends on the specific sensing technology of the particular fingerprint scanner. For capacitive fingerprint scanners, the preferred predetermined object is air. Other predetermined objects for capacitive fingerprint scanners include a liquid (e.g., water) and a solid object with a predetermined dielectric constant; however, other predetermined objects can also be used.

The method and system disclosed herein are able to estimate the scanner pattern in both of these exemplary implementations without any adaptation or adjustment of the modules and their parameters in regard to whether the object applied to the fingerprint scanner is a fingertip or a predetermined object.

In another exemplary implementation of the scanner pattern estimation method where the relationship between the fingerprint pattern and the scanner pattern is or has been transformed into a composition that contains only additive terms, the scanner pattern is isolated by removing the fingerprint pattern from the composition. This isolation can be done by filtering out the terms that represent the fingerprint pattern by a digital filter. The parameters of this filter can be set to predetermined values, selected so as to work well for the fingerprint patterns of most of the population. However, it is best to compute these parameters from the particular image that is being processed. In one implementation, the digital filter is a low-pass filter. Another implementation uses an adaptive filter that estimates the fingerprint pattern and removes it from the composition. Other possible methods for scanner pattern isolation include wavelet transform, principal component analysis, and independent component analysis.

From the estimated scanner pattern, the scanner feature extraction produces different sets of scanner features depending on the application for which the scanner features are intended to be used. In one implementation of the scanner feature extraction method, the extracted scanner features are the same as the scanner pattern, i.e., the scanner feature extraction replicates the scanner pattern to produce the scanner features. In another implementation of the scanner feature extraction method, the scanner features are extracted as to be suited for identifying the particular fingerprint scanner, which they represent, among other fingerprint scanners.

D.4.2 Scanner Authentication Using the Scanner Pattern

Another exemplary implementation is directed to a method for detecting unauthentic fingerprint scanners and unauthentic fingerprint image acquisitions by using the scanner pattern. This method is hereinafter referred to as scanner authentication and includes enrolling the authentic fingerprint scanner and verifying the authenticity of the fingerprint scanner. Enrolling the authentic fingerprint scanner, hereinafter referred to as scanner enrolment, includes: (1) acquiring with the authentic fingerprint scanner at least one digital image; (2) estimating the scanner pattern from the at least one digital image using the methods for scanner pattern estimation disclosed above; (3) extracting scanner features from the scanner pattern using the methods for scanner pattern extraction disclosed above, the scanner features are hereinafter referred to as template scanner features; and (4) storing the template scanner features into the system for future reference.

Verifying the authenticity of a fingerprint scanner, hereinafter referred to as scanner verification, includes: (1) acquiring with the fingerprint scanner at least one digital image; (2) estimating the scanner pattern from the at least one digital image using the methods for scanner pattern estimation disclosed above; (3) extracting scanner features from the scanner pattern using the methods for scanner pattern extraction disclosed above, the scanner features are hereinafter referred to as query scanner features; (4) comparing the query scanner features with the template scanner features to compute a measure of similarity between the query scanner features and the template scanner features; and (5) converting the similarity measure into a decision that the two sets of scanner features either do or do not arise from the same fingerprint scanner. The decision is hereinafter referred to as scanner match if the similarity score is within a predetermined range of values, and the decision is referred to as scanner non-match if the similarity measure is outside the predetermined range of values. When the decision is scanner match, then the digital image is considered as being acquired with the authentic fingerprint scanner, and the acquisition is an authentic fingerprint image acquisition. When the decision is scanner non-match, the digital image is considered as being acquired with an unauthentic fingerprint scanner, and the acquisition is an unauthentic fingerprint image acquisition.

The listing of query scanner features and template scanner features will partially agree and partially disagree depending on whether or not they originated from the same fingerprint scanner, and this will be captured in the similarity score. It is also possible that the two lists of scanner features differ in the number of features they contain, in which case only the common entries are used in computing the similarity score.

The method and system disclosed herein are able to enroll a scanner from one or more images acquired with a fingerprint applied to the scanner, from one or more images acquired with a predetermined object applied to the scanner, and from some images acquired with a fingerprint applied to the scanner and some images acquired with a predetermined object applied to the scanner, all without any adaptation or adjustment of the modules and their parameters in regard to whether the object applied to the fingerprint scanner is a fingertip or a predetermined object. Similarly, the method and system disclosed herein are able to verify a scanner from one or more images acquired with a fingerprint applied to the scanner, one or more images acquired with a predetermined object applied to the scanner, or from some images acquired with a fingerprint applied to the scanner and some images acquired with a predetermined object applied to the scanner, all without any adaptation or adjustment of the modules and their parameters in regard to whether the object applied to the scanner is a fingertip or a predetermined object.

D.4.3 Bipartite Enrollment

Figure 13:
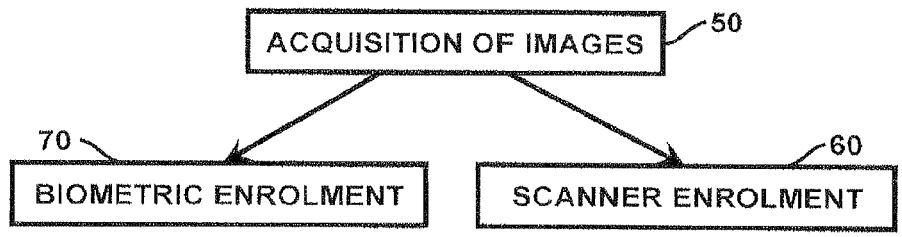
FIG. 13 is an exemplary flow diagram of the method for bipartite enrolment according to an exemplary implementation.

Another exemplary implementation is directed to a method for enrolling the template biometric features and the template scanner features. This method is hereinafter referred to as bipartite enrolment, and is illustrated by flow chart 40 of FIG. 13. Bipartite enrolment includes: (1) acquiring at least one digital image with the authentic fingerprint scanner in acquiring step 50; (2) enrolling the template biometric features in enrolling step 70; and (3) enrolling the template scanner features in enrolling step 60.

In the preferred exemplary implementation of bipartite enrolment three digital images are acquired, but acquiring one, two, or more than three digital images is also possible. In the preferred exemplary implementation of bipartite enrolment, both the biometric enrolment and the scanner enrolment use the same acquired image or the same set of acquired images.

In another exemplary implementation of bipartite enrolment, the scanner enrollment uses another acquired image or another set of acquired images than the image or images acquired for the biometric enrolment. The scanner enrolment is performed with a predetermined object applied to the fingerprint scanner. It is best to acquire the image or the set of images used for the scanner enrolment after acquiring the image or images used for the biometric enrolment. It is also possible to acquire the image or the set of images used for the scanner enrolment before acquiring the image or images used for the biometric enrolment.

D.4.4 Bipartite Verification

Another exemplary implementation is directed to a method for verifying the query biometric features and the query scanner features. This method is hereinafter referred to as bipartite verification. The preferred exemplary implementation for bipartite verification is shown by flow chart 42 in FIG. 14. Bipartite verification includes: (1) acquiring at least one digital image with the authentic fingerprint scanner in acquiring step 50, if the quality of the at least one digital image is not satisfactory, one or more additional digital images may be acquired until digital images with satisfactory quality are acquired to replace the unsatisfactory images; (2) performing biometric verification step 72; (3) performing scanner verification step 62 if the decision in biometric verification step 72 is biometric match; (4) ending with bipartite verification match in step 80 if the decision of scanner verification step 62 is scanner match; ending the bipartite verification with bipartite verification non-match step 82 if the decision of the biometric verification step 72 is biometric non-match ending the bipartite verification with bipartite verification non-match step 82 if the decision of the scanner verification step 62 is scanner non-match.

Figure 14:
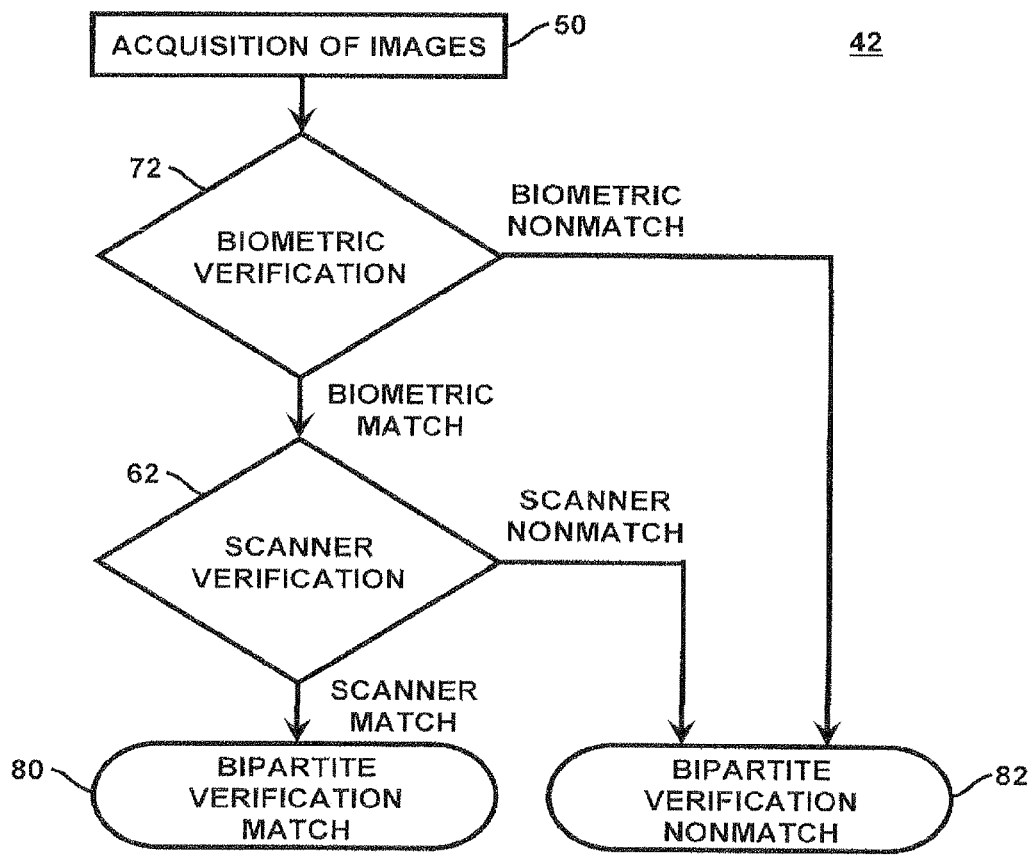
FIG. 14 is an exemplary flow diagram of the method for bipartite verification according to one implementation.

Another exemplary implementation for bipartite verification is shown by flowchart 44 in FIG. 14. This exemplary implementation includes: (1) acquiring at least one digital image with the authentic fingerprint scanner in acquiring step 50, if the quality of the at least one digital image is not satisfactory, one or more additional digital images may be acquired until digital images with satisfactory quality are acquired to replace the images with unsatisfactory quality; (2) performing scanner verification step 64; (3) performing biometric verification step 74 if the decision of scanner verification step 64 is scanner match; (4) ending with bipartite verification match step 80 if the decision of biometric verification step 74 is biometric match; (5) ending with bipartite verification non-match step 82 if the decision of scanner verification step 64 is scanner non-match; and (6) ending with bipartite verification non-match step 82 if the decision of biometric verification step 74 is biometric non-match.

In an exemplary implementation of the scanner authentication method, the similarity measure is a correlation between the query scanner features and the template scanner features. Other exemplary implementations can use different similarity measures between the two sets of features.

In the preferred exemplary implementation of the bipartite verification method, both the biometric verification and the scanner verification use one and the same acquired digital image.

In another exemplary implementation of the bipartite verification method, the scanner verification uses another acquired image than the image acquired for the biometric verification. In this exemplary implementation, the scanner verification uses a digital image acquired with a predetermined object applied to the fingerprint scanner. It is best to acquire the image used for the scanner verification after acquiring the image used for the biometric verification. It is also possible to acquire the image used for the scanner verification before acquiring the image used for the biometric verification.

Depending on the object used for the scanner enrolment and for the scanner verification, the bipartite authentication provides different levels of security. Possible exemplary implementations of the bipartite authentication method and the corresponding levels of security each of them provides are shown as rows in the table of FIG. 16. A fingerprint scanner's pattern can be estimated from two types of images depending on the type of the object applied to the fingerprint scanner:

1. A predetermined, known a priori, object. Since the object is known, the differences (in the general sense) between the image acquired with the predetermined object and the theoretical image that would be acquired if the fingerprint scanner were ideal reveal the scanner pattern because the image does not contain a fingerprint pattern.

2. A fingertip of a person that, generally, is not known a priori. The acquired image in this case is a composition of the fingerprint pattern, the scanner pattern, and the scanner noise.

Figures 15, 16:
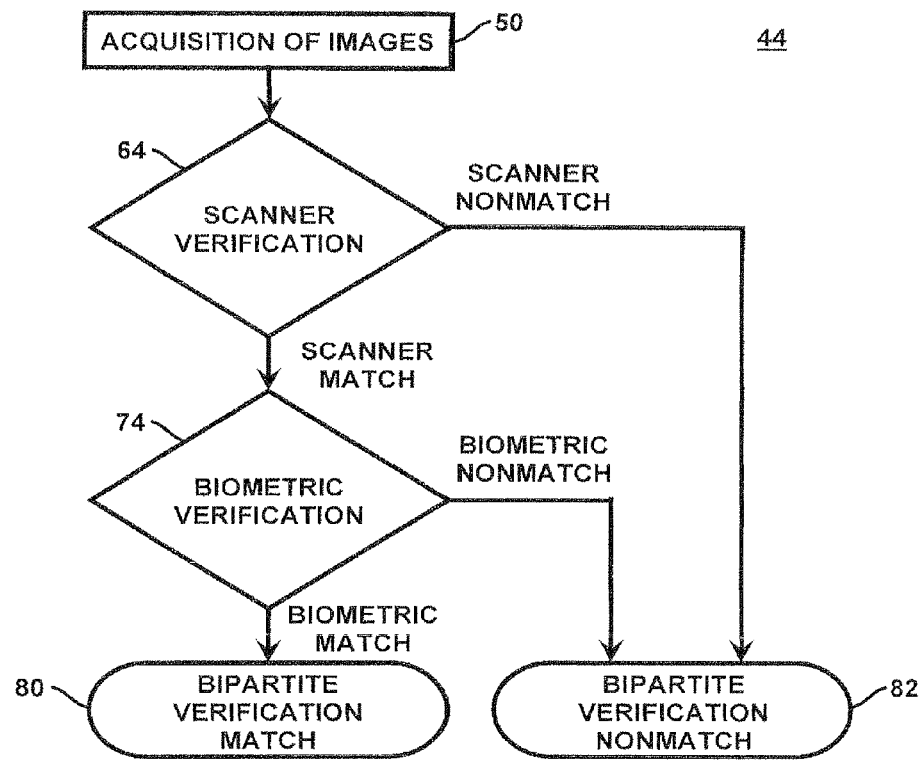
FIG. 15 is a flow diagram of the method for bipartite verification according to another implementation.
FIG. 16 is a table with exemplary implementations of the method for bipartite authentication depending on the object used for the scanner enrolment and for the scanner verification and the corresponding levels of security each implementation provides.

In the exemplary implementation designated as "Scenario A" in FIG. 16, both the scanner enrolment and the scanner verification use an image or images acquired with a predetermined object applied to the fingerprint scanner. Thus, the images used for the biometric enrolment and for the scanner enrolment are different. The images used for the biometric verification and for the scanner verification are also different. Hence, this implementation provides weak security, but its implementation is simple and it is useful in applications that do not require a high level of security. The security level of this exemplary implementation can be increased by other methods. One such method is the scanner pre-authentication, as will be described below.

In the exemplary implementation designated as "Scenario B" in FIG. 16, the scanner enrolment uses an image or images acquired with a predetermined object applied to the fingerprint scanner. Thus, the images used for the biometric enrolment and for the scanner enrolment are different. The images used for the biometric verification and for the scanner verification, however, are the same. For the scanner verification, the scanner pattern is estimated from a digital image or digital images acquired with the fingertip of the user applied to the fingerprint scanner. This exemplary implementation provides a medium level of security, and it is useful in applications that do not require a high level of security. The security level of this exemplary implementation can be increased by other methods. One such method is the scanner pre-authentication, as will be described below.

In the exemplary implementation designated as "Scenario C" in FIG. 16, the images used for the biometric enrolment and for the scanner enrolment are the same, and the scanner enrolment uses a digital image or digital images acquired with the fingertip of the user applied to the fingerprint scanner. The images used for the biometric verification and for the scanner verification are also the same, and the scanner verification uses a digital image or digital images acquired with the fingertip of the user applied to the fingerprint scanner. This exemplary implementation provides strong security. This is the preferred exemplary implementation.

D.4.5 Exemplary Implementations for Improved Security of User Biometric Authentication The method for bipartite authentication can be used to improve the biometric authentication of a user to a system by detecting attacks on the fingerprint scanner that replace a digital image containing a legitimate user's fingerprint pattern and acquired with the authentic fingerprint scanner by a digital image that still contains the fingerprint pattern of the legitimate user but has been acquired with an unauthentic fingerprint scanner. This type of attack will become an important security threat as the widespread use of the biometric technologies makes the biometric information essentially publicly available. In particular, since the biometric information has a low level of secrecy, an attacker may possess complete information about the fingerprint of the legitimate user, which includes:

(a) possession of digital images of the fingerprint of the legitimate user acquired with an unauthentic fingerprint scanner, including images acquired in nearly ideal conditions and with very high resolution;

(b) possession of any complete or partial information about user's fingertip obtained from a latent fingerprint, i.e., from an impression left by user's fingertip on a surface;

(c) possession of fingerprint features (e.g., minutiae) extracted from user's fingerprint image;

(d) ability to artificially produce digital images that are synthesized from partial or complete information about user's fingerprint.

An attacker who has full physical access to the network 120 and system 130 in FIGS. 2-4, may replace the digital image acquired by the authentic fingerprint scanner by another, unauthentic digital image (i.e., acquired with an unauthentic fingerprint scanner or artificially synthesized) that contains the fingerprint pattern of the legitimate user. In this case, the biometric verification will output a biometric match (with high probability). Thus, without additional verification, the unauthentic digital image would be accepted as legitimate and would lead to positive biometric authentication. By using the method of bipartite authentication, however, the system will additionally perform scanner verification which will determine (with high probability) that the unauthentic digital image has not been acquired with the authentic fingerprint scanner, and thus, the bipartite verification will end with bipartite verification non-match (with high probability). Therefore, the attack on the fingerprint scanner will be detected.

A very significant advantage of each exemplary implementation is that it can be implemented in systems that have already been manufactured and even sold to customers by upgrading their system software, firmware, and/or hardware (if using programmable hardware blocks), which can be done even online. The methods and apparatus taught in the prior art for identifying devices by designing special hardware, in particular analog and/or digital circuits, typically incur material and manufacturing cost and are not applicable to systems (including fingerprint scanners) that have already been manufactured.

Since scanner authentication is essentially only one part of the whole authentication process (see bipartite authentication above), objective and subjective time constraints are usually in place for such scanner authentication. Furthermore, the conventional fingerprint verification algorithms typically are very computationally intensive. This problem can be particularly severe in portable devices. Therefore, the scanner authentication should impose as little additional computational burden as possible. Although the time requirements for the scanner enrolment can be loose (i.e., users would tolerate longer time to enroll their biometrics and devices), the scanner verification should take very little time, such as one second or even much less. As a consequence, this computational efficiency is a key element of the exemplary implementations, leading to straight forward and extremely computationally efficient implementations.

Another advantage of each one of the exemplary implementations is its robustness and stability, in particular under wide variety of conditions—environmental changes (temperature, humidity, dirt/grease, pressure, etc.), changes in the fingers (scratches, wear, etc.), and implementation imperfections (round-off errors and limited computational power). For example, the exemplary implementations were specifically developed to handle temperature variations and significant presence of water on the fingertip (not only the ordinary skin moisture). Another example is solving the problems arising from pressing the fingertip too hard to the scanner platen, which problems the exemplary implementations handle particularly well.

In addition, all exemplary implementations are able to work with microprocessors that use fixed point arithmetic, i.e., they can tolerate round-off effects due to finite-length effects in the parameter and coefficient quantization and in the signal quantization. The dynamic range of the input signal (the pixels of the image) is clearly defined and limited to 8 bits/pixel, which greatly facilitates the design of the scaling coefficients between the consecutive stages of the processing (both in a microprocessor and in a dedicated computational hardware). All computations used revolve around computing moving-average sums (which cannot create overshoots in the intermediate signals) and scaling with bounded (even to a great extent predetermined) numbers. The computation of the correlation and its variants as well as the relative mean-square error, as to the fact that they involve multiplication and accumulation of two signals, can be arranged to operate with the current indices and thus the current sum to never exceed the dynamic range of the finite-precision arithmetic. The rest of the processing is indexing and comparisons (e.g., for pixel selection). Transforms that represent a signal from one domain in another domain (like the Fourier transform) are typically susceptible to numerical problems, and to avoid this, no transforms are employed in the disclosed exemplary implementations. And finally, even when software libraries that emulate floating-point arithmetic are used instead, the exemplary implementations still have an edge over the prior art because of its simplicity and computational efficiency.

The preferred implementation has been tested with over 10,000 images, acquired with over 20 fingerprint scanners of Signal Model A. In these tests both the false accept rate and the false reject rate of the scanner authentication were zero. No decision errors were registered, even when applying one finger for scanner enrollment and another finger for scanner authentication. Moreover, the margin between the similarity scores for authentic and non-authentic scanners is significant. The performance also decreases gradually when decreasing the available computational power (e.g., when smaller number of pixels is processed). The exemplary implementations also have a fail-safe guard; if the number of pixels to be used for computing the similarity score falls below a certain value, the Matching Module flags this to avoid producing an unreliable decision.

The exemplary methods and apparatuses disclosed are suited for any system that uses biometric authentication using fingerprints, especially for systems that operate in uncontrolled (i.e., without human supervision) environments. The methods are particularly suited for portable devices, such as PDAs, cell phones, smart phones, multimedia phones, wireless handheld devices, and generally any mobile devices, including laptops, netbooks, etc., because these devices can be easily stolen, which gives an attacker physical access to them and the opportunity to interfere with the information flow between the fingerprint scanner and the system. For example, an attacker may be able to replace the digital image that is acquired with the authentic fingerprint scanner with another digital image, even of the legitimate user, but acquired with unauthentic fingerprint scanner, in order to influence the operation of the authentication algorithms that are running in the system. This possibility exists even in systems that have trusted computing functionality (e.g., equipped with a Trusted Platform Module, TPM, that provides complete control over the software, running in the system) since the attacker needs not modify the software in order to achieve successful authentication; only replacement of the digital image may be sufficient. However, the method and apparatus for bipartite authentication, disclosed herein, provides a mechanism to determine the authenticity of the fingerprint scanner with which the digital image has been acquired and thus detect such an attack.

Another application is in the hardware tokens. Many companies and organizations provide hardware tokens to their customers or employees for user authentication and for digital signing of their transactions, usually by using challenge-response security protocols over a network. Typically, the customers authenticate themselves to the hardware token using a PIN code, a password, and/or a bank card. If the hardware token is also equipped with a fingerprint scanner, the methods provided in the exemplary implementations can increase the security of the hardware tokens by adding authentication using user's fingerprint and detecting attacks on the fingerprint scanner, including replacing the digital images acquired with the authentic fingerprint scanner. It is also possible to replace the authentication based on a secret code (a PIN code or a password) with biometric authentication (user's fingerprint pattern).

Thus, the methods provided in the exemplary implementations can be used in bank applications, in mobile commerce, for access to health care anywhere and at any time, for access to medical records, etc.

D.4.6 Advantages of the Exemplary Implementations

Objective and subjective time constraints are usually in place for the scanner authentication because it is only one part of the whole authentication process (e.g., as in the bipartite authentication). Furthermore, the conventional fingerprint verification is typically computationally intensive. The time limitation can be particularly severe in mobile devices because they are constrained both in computational power and in energy. Therefore, the scanner authentication should impose as little additional computational burden as possible. Although the time requirements for the scanner enrolment can be loose (because users could tolerate longer time to enroll their biometrics and device), the scanner verification should take very little time, such as a second or even much less. Finally, high speed of matching is required in scanner identification applications. To achieve this, the methods and systems disclosed herein have been developed to be extremely computationally efficient and fast. This is achieved by using only one-dimensional signal processing, which in addition is also very simple, e.g., it is not necessary to compute even conventional convolution. The second reason is the absence of any transforms from one domain into another (like the Fourier transform). These two reasons result in linear dependence between the number of computations needed and the number of pixels used.

All modules and modes are unconditionally stable as there are no feedback loops in any form and at any level. Due to their simplicity, they can tolerate round-off effects due to finite precision limitations in the parameters and coefficients and due to signal quantization. This enables implementing them in systems, using microprocessors and/or dedicated computational hardware, with fixed-point arithmetic. This is particularly important since floating-point coprocessors are typically absent in most mobile phones. Since the pixel depth of the input image g is limited to 8 bits/pixel, it simplifies the design of scaling coefficients at the interfaces among the consecutive stages of processing both in a microprocessor and in dedicated computational hardware. All processing revolves around computing moving-average sums, which cannot create overshoots in the intermediate signals, and around scaling with bounded numbers. The computation of correlation, as well as of a relative mean-square error, involves multiplication and accumulation of two signals and can be arranged to operate with the running indices; thus, the running sum will never exceed the dynamic range of the finite-precision arithmetic unit. The rest of the processing is indexing and comparisons (e.g., for masking).

The herein disclosed methods and systems also do not employ transforms across domains (like the Fourier transform), which are typically susceptible to numerical problems due to the finite word length. The inverse mode, however, may require care when implementing it in fixed point because of potential roundoff errors. Finally, they have an edge over future methods that require floating point computations and use software libraries to emulate floating-point arithmetic because the latter will probably be more time and/or energy consuming.

Another advantage of the herein disclosed methods and systems is their robustness and stability under a wide variety of conditions—environmental changes (temperature, air humidity, skin moisture, dirt and grease, fingertip pressure, etc.), changes in the fingers (scratches, wear, etc.), and implementation imperfections (round-off errors and limited computational power). For example, the exemplary implementations were specifically developed to work in a range of temperatures and with a significant amount of water present on the fingertip (not only the ordinary skin moisture). Another example is their ability (via the Masking Module) to particularly well handle the problems arising from strongly pressing a fingertip to the scanner platen. In addition to working with images containing patterns of two completely different fingers, both as patterns and as types of fingers, they work properly even when not a fingertip, but another body part is applied to the scanner, e.g., a palm, because they inherently do not rely on specific characteristics of the fingerprint pattern. Finally, the parameters of the modules may be varied in wide ranges.

As the methods disclosed herein do not require changes in the fingerprint scanners, their very significant advantage is that they can be implemented (as add-ons) in systems that have already been manufactured and even placed into service by upgrading their software, firmware, and/or programmable hardware, which can be done even online. Furthermore, the implementations of the methods do not incur additional material and manufacturing costs because we developed them for mainstream, general-purpose, commercial off-the-shelf, low-cost fingerprint scanners as mobile devices are most likely to be equipped only with such components. The methods and systems taught in the prior art for identifying devices by designing special hardware, in particular analog and/or digital circuits, typically incur material and manufacturing cost and are not applicable to systems (including fingerprint scanners) that have already been manufactured.

Since only a single image is needed for scanner enrolment (and also for scanner verification), the methods disclosed herein can also perform automatic scanner re-enrolment. After every successful scanner verification, the query scanner pattern can be stored as a new enrolled scanner pattern and thus adapt the system to long-term changes in the scanner pattern. An extension of this can improve the security by enrolling a new set of, for example, columns (or rows), which can be chosen at random; instead of columns or in addition to columns, even rows can be enrolled. The security is improved because an attacker cannot predict this randomness when constructing images with embedded counterfeit scanner pattern.

As the methods and systems disclosed herein can estimate the scanner pattern from images with air without any adaptation, this can enable (periodic) trustworthiness verification by acquiring images with air and performing tacit scanner authentications. Similarly, to further increase the accuracy of the scanner pattern estimate and the authentication in general, the system, when otherwise idle, can acquire tens or hundreds images with air.

Finally, we have developed the software that processes live images, acquired by the scanners, for one exemplary implementation.

While the foregoing written description of the invention enables one of ordinary skill in the art to make and use what is considered presently to be the preferred implementation or best mode, those of ordinary skill will understand and appreciate the existence of variations, combinations, and equivalents of the specific implementation methods and apparatuses, and examples described herein. The invention should therefore not be limited by the above described implementations, including methods, apparatuses, and examples, but by all such implementations within the scope and spirit of the appended claims.

While the technology herein has been described in connection with exemplary illustrative non-limiting implementations, the invention is not to be limited by the disclosure. For example, while exemplary illustrative non-limiting implementations have been described in connection with self contained biometric scanners, any sort of biometric scanner capable of being connected to a wired and/or wireless network may be used. Although exemplary illustrative non-limiting implementations have been described in connection with the use of fingerprint scanners other types of biometric scanners could be used instead. The invention is intended to be defined by the claims and to cover all corresponding and equivalent arrangements whether or not specifically disclosed herein.

What is claimed is:

1. A method for authenticating scanners, including fingerprint area scanners, said method comprising:
   using an electronic processing circuit configured to perform the following,
   (a) providing at least one enrolled image acquired by a scanner and at least one query image acquired by a scanner;
   (b) selecting a plurality of pixels of said at least one enrolled image as enrolled selected pixels and a plurality of pixels of said at least one query image as query selected pixels;
   (c) masking pixels of said enrolled selected pixels as enrolled useful pixels and pixels of said query selected pixels as query useful pixels, wherein said masking uses at least one predetermined criterion to determine said useful pixels;
   (d) computing a similarity score between the common pixels of said enrolled useful pixels and of said query useful pixels; and
   (e) comparing said similarity score with a threshold value to determine whether said at least one query image has been acquired by the same scanner that acquired said at least one enrolled image.

2. The method of claim 1 wherein said computing is any one of computing a normalized correlation, computing a correlation coefficient, and computing a relative mean square error.

3. The method of claim 2 wherein said masking is threshold masking.

4. The method of claim 2 wherein said selecting is any one of selecting at least one column of pixels, selecting at least one row of pixels, and selecting at least one cross-section of pixels.

5. The method of claim 4 further comprising filtering said enrolled selected pixels and said query selected pixels.

6. The method of claim 5 wherein said filtering uses a low-pass filter.

7. The method of claim 6 further comprising any one of:
   inverting the pixel values of said at least one enrolled image and the pixel values of said at least one query image after (a) and
   inverting the values of said enrolled selected pixels and the values of said query selected pixels after (b).

8. The method of claim 5 wherein said filtering uses a moving-average filter and said masking is any one of magnitude masking and variance masking.

9. The method of claim 8 further comprising any one of:
   inverting the pixel values of said at least one enrolled image and the pixel values of said at least one query image after (a) and
   inverting the values of said enrolled selected pixels and the values of said query selected pixels after (b).

10. The method of claim 5 wherein said filtering uses a Wiener filter and said masking is any one of threshold masking, magnitude masking, and valley masking.

11. The method of claim 10 further comprising any one of:
    inverting the pixel values of said at least one enrolled image and the pixel values of said at least one query image after (a) and
    inverting the values of said enrolled selected pixels and the values of said query selected pixels after (b).

12. A method for identifying scanners, including fingerprint area scanners, said method comprising:
    using an electronic processing circuit configured to perform the following,
    (a) providing at least one image acquired by a scanner;
    (b) selecting a plurality of pixels of said at least one image as selected pixels;
    (c) masking pixels of said selected pixels as useful pixels, wherein said masking uses at least one predetermined criterion to determine said useful pixels; and
    (d) computing at least one sequence of numbers from said useful pixels containing information which represents the scanner that acquired said at least one image.

13. The method of claim 12 wherein said masking is threshold masking.

14. The method of claim 12 wherein said selecting is any one of selecting at least one column of pixels, selecting at least one row of pixels, and selecting at least one cross-section of pixels.

15. The method of claim 14 further comprising filtering said selected pixels.

16. The method of claim 15 wherein said filtering uses a low-pass filter.

17. The method of claim 16 further comprising any one of:
    inverting the pixel values of said at least one image after (a) and
    inverting the values of said selected pixels after (b).

18. The method of claim 15 wherein said filtering uses a moving-average filter and said masking is any one of magnitude masking and variance masking.

19. The method of claim 18 further comprising any one of:
    inverting the pixel values of said at least one image after (a) and
    inverting the values of said selected pixels after (b).

20. The method of claim 15 wherein said filtering uses a Wiener filter and said masking is any one of threshold masking, magnitude masking, and valley masking.

21. The method of claim 20 further comprising any one of:
    inverting the pixel values of said at least one image after (a) and
    inverting the values of said selected pixels after (b).

22. A system for authenticating scanners, including fingerprint area scanners, said system comprising:
    providing means for providing at least one enrolled image acquired by a scanner and at least one query image acquired by a scanner;
    selecting means for selecting a plurality of pixels of said at least one enrolled image as enrolled selected pixels and a plurality of pixels of said at least one query image as query selected pixels;
    masking means for masking pixels of said enrolled selected pixels as enrolled useful pixels and pixels of said query selected pixels as query useful pixels, wherein said masking means uses at least one predetermined criterion to determine said useful pixels;
    computing means for computing a similarity score between the common pixels of said enrolled useful pixels and of said query useful pixels; and
    comparing means for comparing said similarity score with a threshold value to determine whether said at least one query image has been acquired by the same scanner that acquired said at least one enrolled image.

23. The system of claim 22 wherein said computing means computes any one of a normalized correlation, a correlation coefficient, and a relative mean square error.

24. The system of claim 23 wherein said masking means performs threshold masking.

25. The system of claim 23 wherein said selecting means selects any one of at least one column of pixels, at least one row of pixels, and at least one cross-section of pixels.

26. The system of claim 25 further comprising filtering means that filters said enrolled selected pixels and said query selected pixels.

27. The system of claim 26 wherein said filtering means uses a low-pass filter.

28. The system of claim 27 further comprising any one of:
an inverting means for inverting the pixel values of said at least one enrolled image and the pixel values of said at least one query image and
an inverting means for inverting the values of said enrolled selected pixels and the values of said query selected pixels.

29. The system of claim 26 wherein said filtering means uses a moving-average filter and said masking means performs any one of magnitude masking and variance masking.

30. The system of claim 29 further comprising any one of:
an inverting means for inverting the pixel values of said at least one enrolled image and the pixel values of said at least one query image and
an inverting means for inverting the values of said enrolled selected pixels and the values of said query selected pixels.

31. The system of claim 26 wherein said filtering means uses a Wiener filter and said masking means performs any one of threshold masking, magnitude masking, and valley masking.

32. The system of claim 31 further comprising any one of:
an inverting means for inverting the pixel values of said at least one enrolled image and the pixel values of said at least one query image and
an inverting means for inverting the values of said enrolled selected pixels and the values of said query selected pixels.

33. A system for identifying scanners, including fingerprint area scanners, said system comprising:
providing means for providing at least one image acquired by a scanner;
selecting means for selecting a plurality of pixels of said at least one image as selected pixels;
masking means for masking pixels of said selected pixels as useful pixels, wherein said masking means uses at least one predetermined criterion to determine said useful pixels; and
computing means for computing at least one sequence of numbers from said useful pixels containing information which represents the scanner that acquired said at least one image.

34. The system of claim 33 wherein said masking means performs threshold masking.

35. The system of claim 33 wherein said selecting means selects any one of at least one column of pixels, at least one row of pixels, and at least one cross-section of pixels.

36. The system of claim 35 further comprising filtering means that filters said selected pixels.

37. The system of claim 36 wherein said filtering means uses a low-pass filter.

38. The system of claim 37 further comprising any one of an inverting means for inverting the pixel values of said at least one image and an inverting means for inverting the values of said selected pixels.

39. The system of claim 36 wherein said filtering means uses a moving-average filter and said masking means performs any one of magnitude masking and variance masking.

40. The system of claim 39 further comprising any one of an inverting means for inverting the pixel values of said at least one image and an inverting means for inverting the values of said selected pixels.

41. The system of claim 36 wherein said filtering means uses a Wiener filter and said masking means performs any one of threshold masking, magnitude masking, and valley masking.

42. The system of claim 41 further comprising any one of an inverting means for inverting the pixel values of said at least one image and an inverting means for inverting the values of said selected pixels.

\* \* \* \* \*